(12) United States Patent
Boutaud

(10) Patent No.: US 7,389,405 B2
(45) Date of Patent: Jun. 17, 2008

(54) DIGITAL SIGNAL PROCESSOR ARCHITECTURE WITH OPTIMIZED MEMORY ACCESS FOR CODE DISCONTINUITY

(75) Inventor: Frederic Boutaud, Belmont, MA (US)

(73) Assignee: Mediatek, Inc., Hsin-Chu (TW)

( * ) Notice: Subject to any disclaimer, the term of this patent is extended or adjusted under 35 U.S.C. 154(b) by 522 days.

(21) Appl. No.: 10/715,629

(22) Filed: Nov. 17, 2003

(65) Prior Publication Data

US 2005/0108505 A1    May 19, 2005

(51) Int. Cl.
*G06F 9/38* (2006.01)
(52) U.S. Cl. .......................... 712/207; 712/43; 712/208; 712/234; 712/226
(58) Field of Classification Search .................... 712/43, 712/207, 208, 226, 234
See application file for complete search history.

(56) References Cited

U.S. PATENT DOCUMENTS

| 4,276,594 | A | * | 6/1981 | Morley ........................ 713/600 |
| 5,434,989 | A | | 7/1995 | Yamaguchi |
| 5,623,311 | A | * | 4/1997 | Phillips et al. .......... 375/240.25 |
| 5,809,550 | A | * | 9/1998 | Shukla et al. ................ 711/167 |
| 2002/0056030 | A1 | | 5/2002 | Kelly et al. |
| 2002/0178350 | A1 | | 11/2002 | Chung et al. |

* cited by examiner

*Primary Examiner*—Tonia L. M. Dollinger
(74) *Attorney, Agent, or Firm*—Gauthier & Connors LLP

(57) ABSTRACT

A method and architecture accesses a unified memory in a micro-processing system having a two-phase clock. The unified memory is accessed during a first instruction cycle. When a program code discontinuity is encountered, the unified memory is accessed a first time during an instruction cycle with a dummy access. The unified memory is accessed a second time during the instruction cycle when a program code discontinuity is encountered with either a data access, as in the case of a last instruction of a loop, or an instruction access, as in the case of a jump instruction.

14 Claims, 18 Drawing Sheets

DIGITAL SIGNAL PROCESSOR ARCHITECTURE WITH OPTIMIZED MEMORY ACCESS FOR CODE DISCONTINUITY

FIELD OF THE PRESENT INVENTION

The present invention is directed to a micro-architecture for a digital signal processor or microprocessor that enables single cycle instruction execution. More particularly, the present invention is directed to a micro-architecture for a digital signal processor or microprocessor that maintains a singe cycle execution for all instructions while enabling the use of single port synchronous memories.

BACKGROUND OF THE PRESENT INVENTION

A conventional digital signal processor or microprocessor needs to be fed information (data and instruction) coming from memories to execute or perform tasks. It is further noted that some tasks, such as digital signal processing tasks, require multiple bytes or words of information per instruction, bytes or words being stored at different memory locations. In such a case, the conventional processors require several memory accesses per instruction. This presents a problem if it is desired to execute an instruction in a single cycle in a unified memory space where information (data and instructions) can be stored in the same block of memory.

For example, in conventional processor architecture, if it is required to double access a primary memory in a single cycle to realize the execution of an instruction in a single cycle. As such, the processor must fetch the new instruction following the current one and read or write all the primary memory data needed for the execution of the current instruction during the single cycle.

In the conventional processor architecture, the memory accesses are performed during the instruction's execute phase, referenced for example in a synchronous system from the rising edge to the rising edge of the main processor clock. The address for the data to be written or read is available at the beginning of the execute phase (usually computed during a previous instruction's execute phase), data access cycles are from rising edge to rising edge, with the access triggered in the middle of the execute phase on the falling edge.

Similarly, in the conventional processor architecture, the address of the instruction to be fetched from the primary memory is available at the beginning of the cycle and the instruction read from the primary memory is loaded into a register at the end of the cycle. This causes the access of the instruction to also happen in the middle of the cycle.

Therefore, in the conventional processor architecture, the primary memory access for the instruction fetch would be in conflict with the concurrent data access. This is particularly true if the accesses are directed to the same block of memory or if the accesses are accomplished using one unique bus.

To address this problem, it has been proposed to use a dual port memory that allows two concurrent read. It has been further proposed to use of a higher frequency clock to squeeze two accesses in a single cycle and still leave enough time for the address to set up and the data to set up.

The two above proposed solutions have their own disadvantages, they are expensive, realize high power consumption, and limit the overall performance.

Another proposed alternative is to change the pipeline and increase the number of pipe stages. This is not possible because it is desirable to maintain single cycle execution for all instructions including branches, jumps, etc.

Therefore, it is desirable to provide micro-architecture that enables two memory accesses per memory block per instruction cycle and does not negatively impact the cost or performance of the processor or require higher power consumption. It is also desirable to provide micro-architecture that enables two memory accesses to a single memory block per instruction cycle, while maintaining single cycle execution for all instructions including branches, jumps, etc. More specifically, it is desirable to provide micro-architecture that maintains singe cycle execution of all instructions while enabling the use of single port synchronous memories to store both data and instructions and improving overall speed performance and keeping the power consumption low.

SUMMARY OF THE PRESENT INVENTION

A first aspect of the present invention is a method for accessing a unified memory in a micro-processing system having a microprocessor, a one level pipeline, and a two-phase clock, such that all instructions are executed in a single cycle. The method fetches a program instruction from the unified memory; determines if the fetched program instruction would require three unified memory accesses during a single instruction cycle for proper execution of the fetched program instruction, proper execution of the fetched program instruction being the microprocessor performing the operations requested by the fetched program instruction in a single instruction cycle; accesses the unified memory a first time, during the instruction cycle associated with the fetched program instruction, with a dummy access when it is determined that the fetched program instruction requires three unified memory accesses for proper execution of the fetched program instruction; fetches a next program instruction from an instruction register, during the instruction cycle associated with the fetched program instruction, when it is determined that the fetched program instruction requires three unified memory accesses for proper execution of the fetched program instruction; and accesses the unified memory a second time, during the instruction cycle associated with the fetched program instruction, with a data access when it is determined that the fetched program instruction requires three unified memory accesses for proper execution of the fetched program instruction.

A second aspect of the present invention is a method for accessing a unified memory in a micro-processing system having a microprocessor, a one level pipeline, and a two-phase clock, such that all instructions are executed in a single cycle. The method fetches a program instruction from the unified memory during a first instruction cycle; determines if the fetched program instruction for a second instruction cycle is a conditional program code discontinuity; accesses the unified memory a first time during the second instruction cycle with a dummy access when it is determined that the program instruction accessed for a second instruction cycle is a conditional program code discontinuity; and accesses the unified memory a second time during the second instruction cycle to read a new instruction when it is determined the program instruction accessed for a second instruction cycle is a conditional program code discontinuity, thereby delaying the instruction access from the unified memory for the second instruction cycle by a half cycle.

A third aspect of the present invention is a method for accessing a unified memory in a micro-processing system having a microprocessor, a one level pipeline, and a two-phase clock, such that all instructions are executed in a single cycle. The method fetches a program instruction from the unified memory; determines if the fetched program instruction is a loop initiation instruction; stores a first instruction of the loop in an instruction register when the fetched program instruction is a loop initiation instruction; executes the loop; determines if a fetched instruction during the execution of the loop is a last instruction of the loop; accesses the unified memory a first time, during the instruction cycle associated with the fetched last instruction of loop, with a dummy access; fetches the first instruction of the loop from the instruction register, during the instruction cycle associated with the fetched last instruction of loop; and accesses the unified memory a second time, during the instruction cycle associated with the fetched last instruction of loop, with a data access.

A fourth aspect of the present invention is a method for accessing a unified memory in a digital signal processing subsystem during a loop instruction. The method accesses a program instruction from the unified memory during a first instruction cycle; determines a type of program instruction; pre-fetches a next instruction from the unified memory; saves the pre-fetched instruction in a register when it is determined that the type of program instruction is a first instruction of a loop; fetches a next instruction from the register when it is determined that the type of program instruction is a last instruction of a loop; accesses the unified memory with a dummy access during execution of the last instruction of the loop; and accesses the unified memory, a second time, with a data access during execution of the last instruction of the loop.

BRIEF DESCRIPTION OF THE DRAWINGS

The present invention may take form in various components and arrangements of components, and in various steps and arrangements of steps. The drawings are only for purposes of illustrating a preferred embodiment and are not to be construed as limiting the present invention, wherein.

DETAILED DESCRIPTION OF THE PRESENT INVENTION

Figure 1:
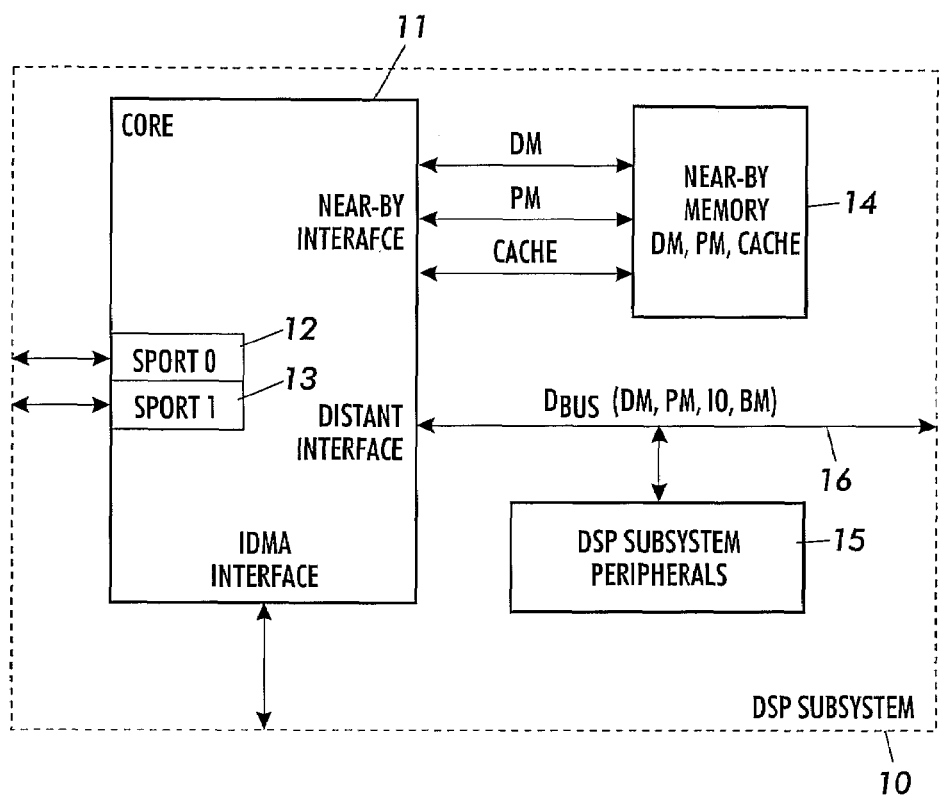
FIG. 1 is a block diagram of a digital signal-processing subsystem architecture according to the concepts of the present invention.

The present invention will be described in connection with preferred embodiments; however, it will be understood that there is no intent to limit the present invention to the embodiments described herein. On the contrary, the intent is to cover all alternatives, modifications, and equivalents as may be included within the spirit and scope of the present invention as defined by the appended claims.

For a general understanding of the present invention, reference is made to the drawings. In the drawings, like reference numbering has been used throughout to designate identical or equivalent elements. It is also noted that the various drawings illustrating the present invention are not drawn to scale and that certain regions have been purposely drawn disproportionately so that the features and concepts of the present invention could be properly illustrated.

To address the situation of several memory accesses per instruction wherein the data is located in the same memory bank as the instruction, the present invention utilizes a micro-architecture that enables two memory accesses to a first memory block per instruction and per cycle and one memory access to a second memory block during the same cycle.

Thus, the present invention provides three memory accesses per clock cycle or instruction. One access is performed in a data memory block during the clock cycle or instruction, and the two other accesses are performed in a program memory block that contains both data and instruction information, the two other accesses being performed during the same clock cycle or instruction.

Moreover, the micro-architecture of the present invention realizes a single cycle execution on simple pipeline of instructions requiring two or three memory accesses by performing, in parallel, two memory accesses on a single memory block per clock cycle, the third access being performed in parallel on a different block of memory. More specifically, the present invention eases the constraints for speed due to such double access per clock cycle and simplifies the micro-architecture so that logic implementation is more efficient in term of performance.

Finally, the present invention enables the use of single port memory, synchronous access in an architecture that executes all instructions in a single cycle including zero overhead loop or repeat function while still maintaining a high performance level.

FIG. 1 illustrates a digital signal processing subsystem architecture according to the concepts of the present invention. As illustrated in FIG. 1, a digital signal processing subsystem 10 includes a core 11; a nearby memory module 14 including data memory, program memory, and cache memory blocks; a data bus 16; and digital signal processing subsystem peripherals 15.

The core 11 has two types of interfaces. The first interface, near-by interface, provides fast single cycle execution for memories inside the digital signal processing subsystem 10 of a system on a chip. The second interface, distant interface, provides multi-cycle interface to peripheral logic inside the digital signal processing subsystem 10 and other memory/peripherals outside the digital signal processing subsystem's boundaries. It is noted that in this situation, any combination of accesses to a distant memory (a distant memory being a memory outside the digital signal processing subsystem's boundaries) takes at least two cycles.

In the micro-architecture of the present invention, three spaces are defined. These spaces are the data memory (DM) space, the program memory (PM) space, and the input-output (I/O) space. The PM space, in a preferred embodiment of the present invention, contains both instructions and data (16 or 24 bits). The DM space, in a preferred embodiment of the present invention, contains only data (16 bits). Lastly, the I/O space, in a preferred embodiment of the present invention, regroups 16 bits I/O peripherals.

Since the PM space contains both instruction and data, the PM space can be accessed twice per instruction. To facilitate this functionality, the near-by interface and the associated functions of the present invention are designed to allow two memory accesses per clock cycle. When both the instruction and data are located in the near-by memory module 14, the present invention realizes full speed execution, one instruction per clock cycle.

In a preferred embodiment of the present invention, accesses to the I/O space go through the distant memory interface, via data bus 16, only.

The core 11 can also interact and exchange data with other parts of the system through, for example, the two serial ports, SPORT0 12 and SPORT1 13, or IDMA interface.

In the preferred embodiment of the present invention, four modules can interact with the core 11 and steal cycles from the pipeline to move data to/from memory locations. These modules are the serial ports (SPORT0 12 and SPORT1 13), the internal data memory area (IDMA) interface, and a byte data memory area (BDMA).

The cycle steal occurs at an instruction boundary by holding the next instruction from the program count and inserting a special "dummy" instruction into the pipeline. This dummy instruction does not change the program count nor starts a program instruction fetch.

The dummy instruction commands the core 11 to execute a data move transaction and perform associated register updates (Address register changes in the case of serial port auto-buffering). When the dummy instruction is completed, the core pipeline proceeds with the executable code from program memory.

Idle and bus grants may be also considered as special cases in this category. In these cases, the CPU stops executing, and stolen cycles leave the core 11 frozen until the idle or bus request disappears. The number of cycles may be infinite.

The core 11 has a pipeline that is running from a two-phase clock and is organized to enable single cycle instruction execution, even for program count (PC) discontinuities, thereby enforcing a one level deep pipe composed of two pipe steps: instruction fetch and instruction execution. As noted above, a problem associated with this design is the double accessed of the PM memory in a single cycle. During one instruction, the core 11 must fetch the new instruction and fetch the PM data of the current instruction.

To solve this problem, the present invention enables the address associated with the data being written or read to be available at the beginning of the execute phase (computed in the previous instruction's execute phase). In other words, the present invention provides data access cycles that are from rising edge to rising edge, with the access triggered, for example, in the middle of the execute phase on the falling edge.

Figure 2:
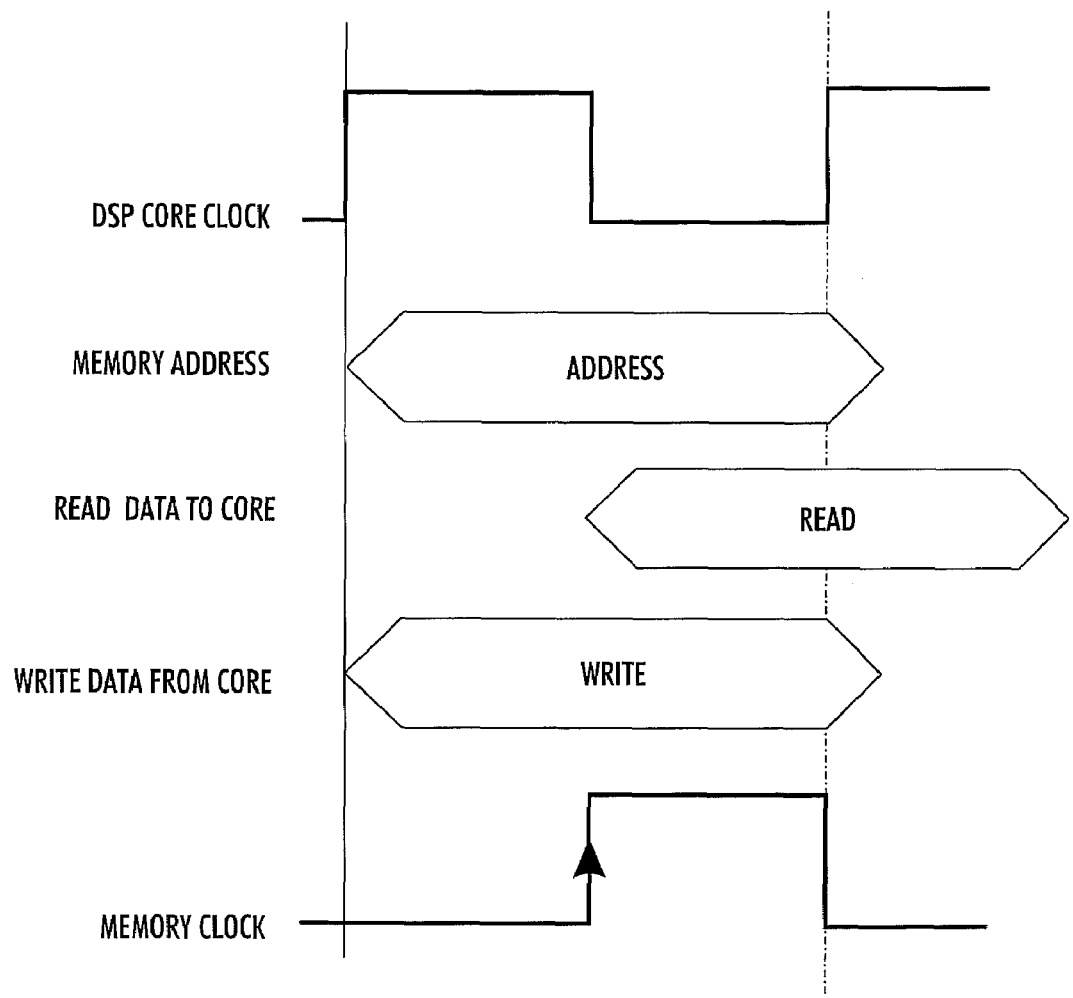
FIG. 2 is a timing diagram illustrating a data memory data access according to the concepts of the present invention.

For example, as illustrated in FIG. 2, the present invention realizes the DM data access in one cycle from rising edge to rising edge of the digital signal processing (DSP) core clock. In this example, the address is sent out on the rising edge of the DSP core clock signal, and the memory access is triggered on the falling edge of the DSP core clock signal (shown in FIG. 2 by the memory clock signal rising edge corresponding to the falling edge of the DSP core clock signal). The data is read or sampled in the core on the next rising edge of the DSP core clock signal. As further illustrated in FIG. 2, write data is sent out of the memory on the rising edge of the DSP core clock signal.

Figure 3:
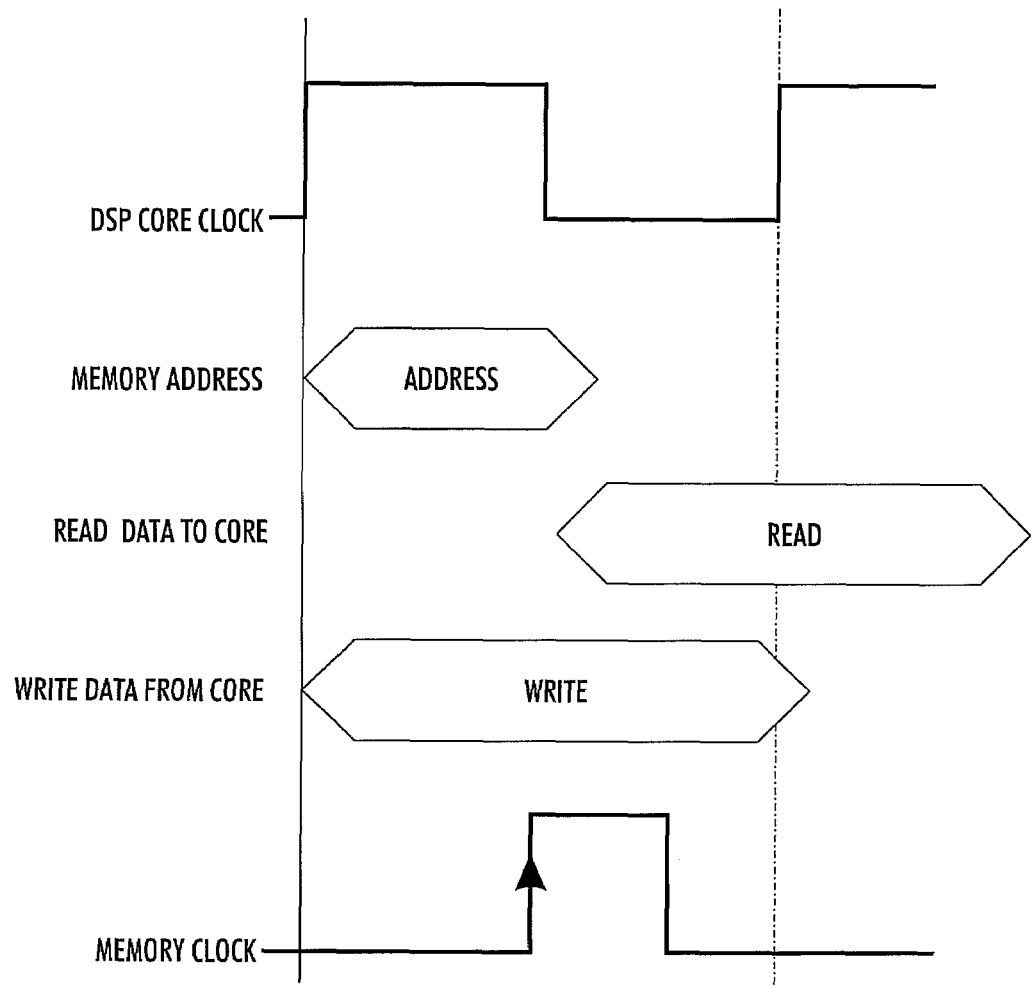
FIG. 3 is a timing diagram illustrating a program memory data access according to the concepts of the present invention.
Figure 4:
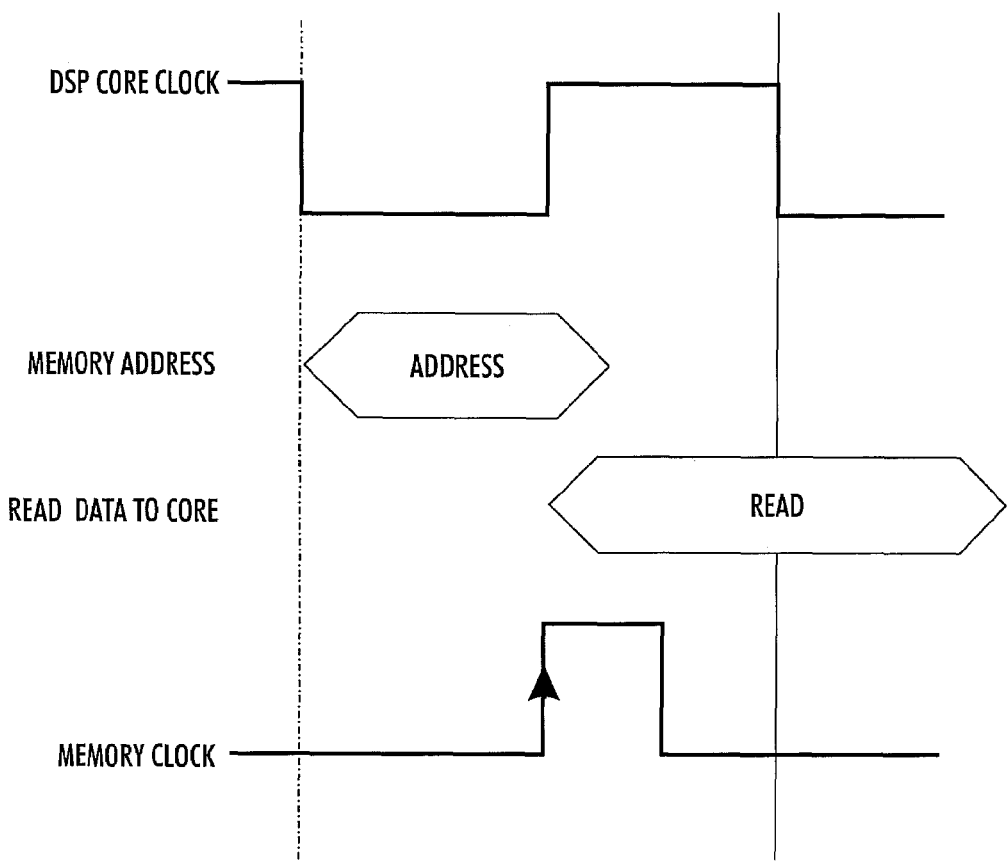
FIGS. 4 and 5 are timing diagrams illustrating a program memory instruction access according to the concepts of the present invention.
Figure 5:
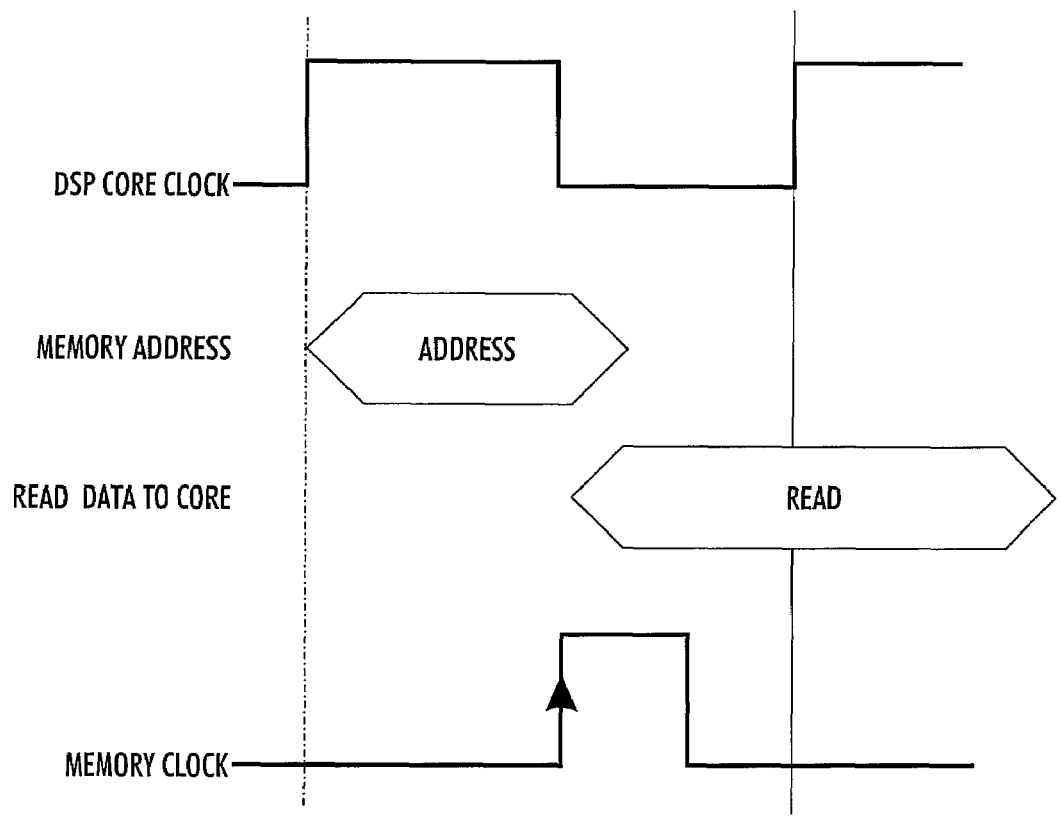

In another example, as illustrated in FIGS. 3-5, the present invention enables PM accesses to pipelined on two half cycles so that two memory accesses can be completed per clock cycle. The two phases of the memory access are address phase and data phase. The access is done differently depending of the access type and the memory type. Since the cache is instruction only, there is no need to accommodate cache for a PM data access.

With respect to FIG. 3, a PM data access is shown that is realized in one cycle from rising edge to rising edge of the DSP core clock signal. In this example, as in FIG. 2, the address is sent out on the rising edge of the DSP core clock signal and is available until the falling edge of the DSP core clock signal. The memory access is triggered on the falling edge of the DSP core clock signal. The data is read or sampled in the core on the next rising edge of the DSP core clock signal. As further illustrated in FIG. 3, write data is sent out of the memory on the rising edge of the DSP core clock signal.

With respect to FIG. 4, a PM Instruction access from in line code in a near-by memory is shown that is realized in one cycle from falling edge to falling edge of the DSP core clock signal. In this example, the address is sent out on the falling edge of the DSP core clock signal and is available until the rising edge of the DSP core clock signal. The memory access is triggered on the rising edge of the DSP core clock signal. The instruction is read or sampled in a buffer on the next falling edge of the DSP core clock signal. The instruction may be discarded if a program count (PC) discontinuity is taken.

With respect to FIG. 5, FIG. 5 shows the timing for both a PM Instruction access, PC discontinuity near-by memory, one cycle from rising edge to rising edge of the DSP core clock signal and a PM Instruction access, near-by cache, one cycle from rising edge to rising edge of the DSP core clock signal. In both of these situations, the address is sent out on the rising edge of the DSP core clock signal, and the memory access is triggered on the falling edge of the DSP core clock signal. The instruction is read or sampled in the core 11 on the next rising edge of the DSP core clock signal.

It is noted, from the examples described above, that dual accessed memory blocks are clocked from a clock signal running twice the frequency of the master pipe clock. This is one possibility of triggering access to synchronous single port memory.

According to the concepts of the present invention, all cache accesses done by the core 11 are aligned on the falling edge of the DSP core clock signal, including data access in data mode for cache initialization and cache test. The other edge of the DSP core clock signal cycle is used for cache fill accesses or dynamic download of the cache. It is noted that in the case of a program count (PC) discontinuity, a dummy instruction fetch is done in the nearby memory at PC+1 before the discontinuity can be detected and confirmed. This dummy read occurs only if the address points to the near-by memory; if the address points to cache or to distant memory, it does not happen. It is further noted that there are no PM data writes/reads into the cache.

Figure 6:
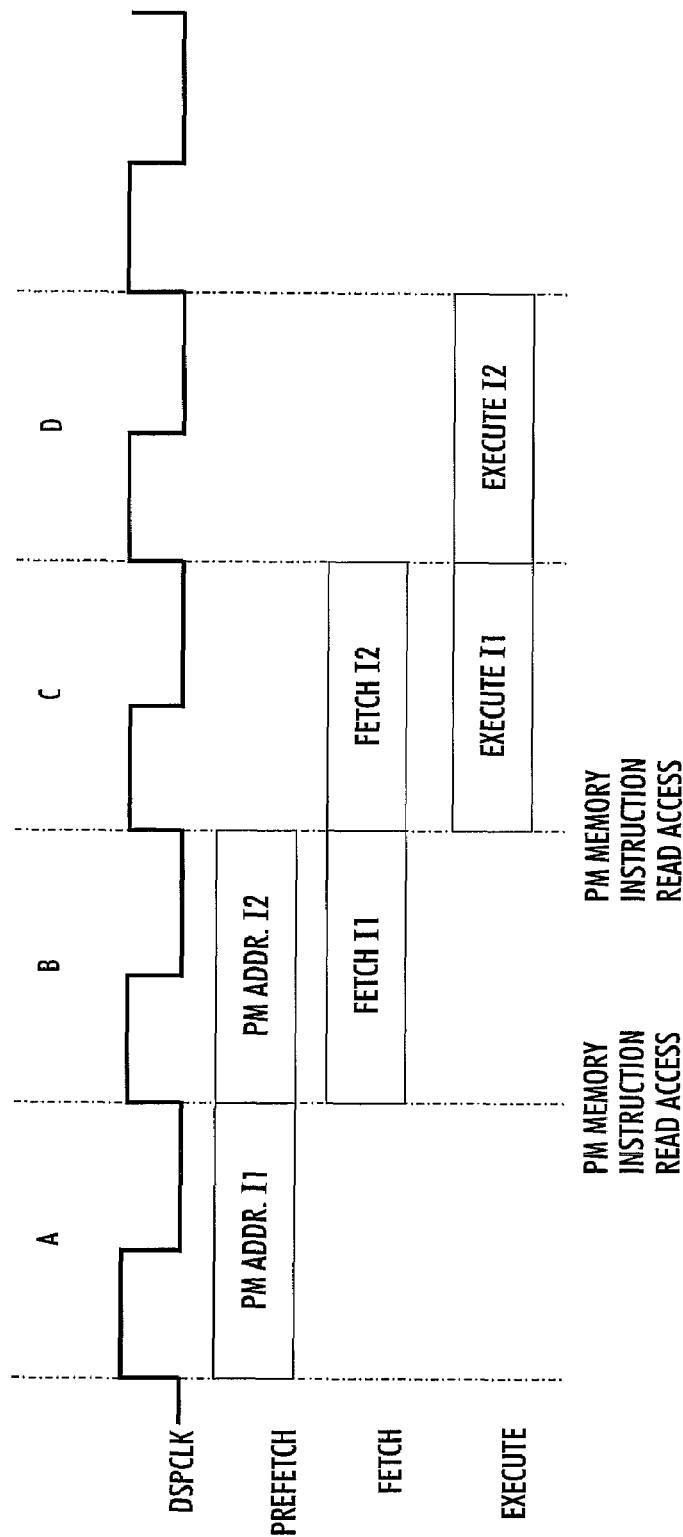
FIG. 6 is a timing diagram illustrating basic pipeline, in-line code, instruction reads according to the concepts of the present invention.

FIG. 6 illustrates a timing diagram for basic pipeline, in-line code, instruction reads according to the concepts of the present invention. As shown in FIG. 6, during cycle A, the PMAddressI1 for instruction I1 is made available.

Thereafter, during cycle B, the PMAddressI2 for instruction I2 is made available, and the PM instruction read access for the instruction I1 is performed wherein the PM instruction read access is triggered upon the rising edge of the DSP core clock signal at the beginning of cycle B.

During cycle C, as shown in FIG. 6, the PM instruction read access for instruction I2 is performed wherein the PM instruction read access is triggered upon the rising edge of the DSP core clock signal at the beginning of cycle C, and the instruction I1 is executed. During cycle D, the instruction I2 is executed.

However, according to the concepts of the present invention, when there is a conditional program count (PC) discontinuity (RTI, RTS, JUMP, CALL, END-OP-LOOP), the new PC address is conditionally generated from the result of the execution of the previous instruction. For timing reason, in this case the PM instruction memory access is moved later by half cycle and the memory is triggered on the falling edge of the clock, as described above with respect to the PM data access illustrated in FIG. 4. The PM instruction access takes the place in the clock cycle of the PM data access since for most of those discontinuity cases no PM data can be requested. An example of the timing for these situations is illustrated in FIG. 7.

Figure 7:
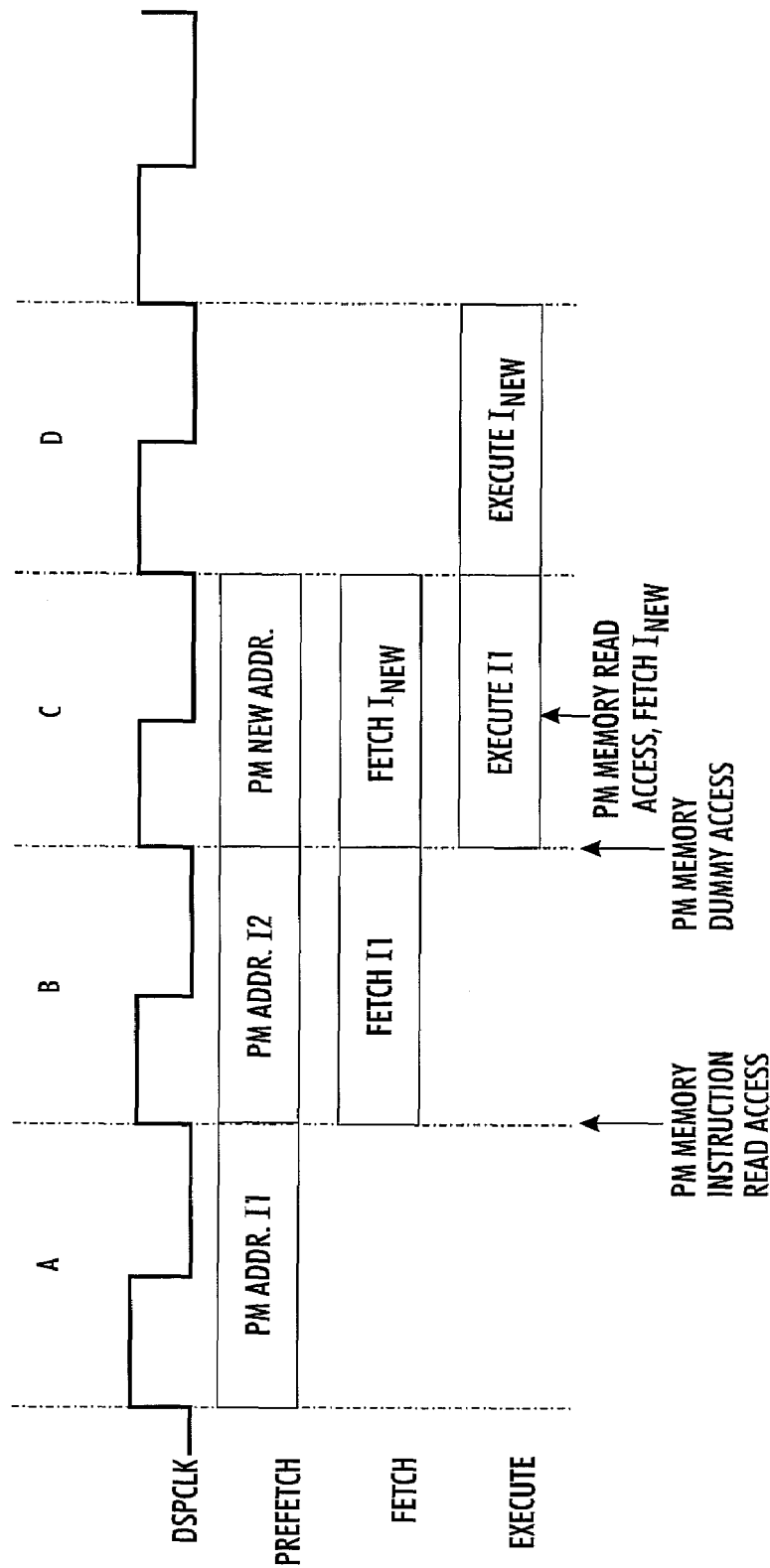
FIG. 7 is a timing diagram illustrating program count discontinuity instruction reads according to the concepts of the present invention.

As shown in FIG. 7, during cycle A, PMAddressI1 for instruction I1 is made available. Thereafter, during cycle B, the PMAddressI2 for instruction I2 is made available, and the PM instruction read access for instruction I1 is performed wherein the PM instruction read access is triggered upon the rising edge of the DSP core clock signal at the beginning of cycle B.

During cycle C, as shown in FIG. 7, PMNewAddress is made available, and a PM memory dummy access is triggered upon the rising edge of the DSP core clock signal at the beginning of cycle C, due to a conditional program count discontinuity. Also, due to the conditional program count discontinuity, during cycle C, the PM instruction read access for instruction Inew is performed wherein the PM instruction read access is triggered upon the falling edge of the DSP core clock signal, and the instruction I1 is executed. During cycle D, the instruction Inew is executed.

On the other hand, if the program count discontinuity is an END-OF-LOOP instruction, a PM data access can be requested and be in conflict with the top of the loop instruction fetch. To avoid conflict with the instruction fetch (top of the loop), the present invention utilizes a 4 deep top-of-loop instruction buffer (200 of FIG. 15) that stores the instruction so that there is no need to re-fetch the first instruction at each loop iteration.

It is noted that the exit condition happens to be from the instruction before last instruction of the loop. If the condition is from the last instruction of the loop, the loop is executed one more time before exiting. In this case, if the status is changed during the loop, a false decision may be done, as the value of the last status update is being checked for the loop exit condition.

In the case of a PC discontinuity due to end of loop, the program count must move to the top of the loop. Due to the pipeline, at the same time, the instruction at the end of loop may do a PM data access. This is potentially in conflict with the Program instruction fetch. The top of loop instruction stack, as described above and illustrated as part of the PM interface logic of FIG. 15, frees up the cycle from doing the instruction fetch, leaving the cycle available for the PM data access.

Figure 8:
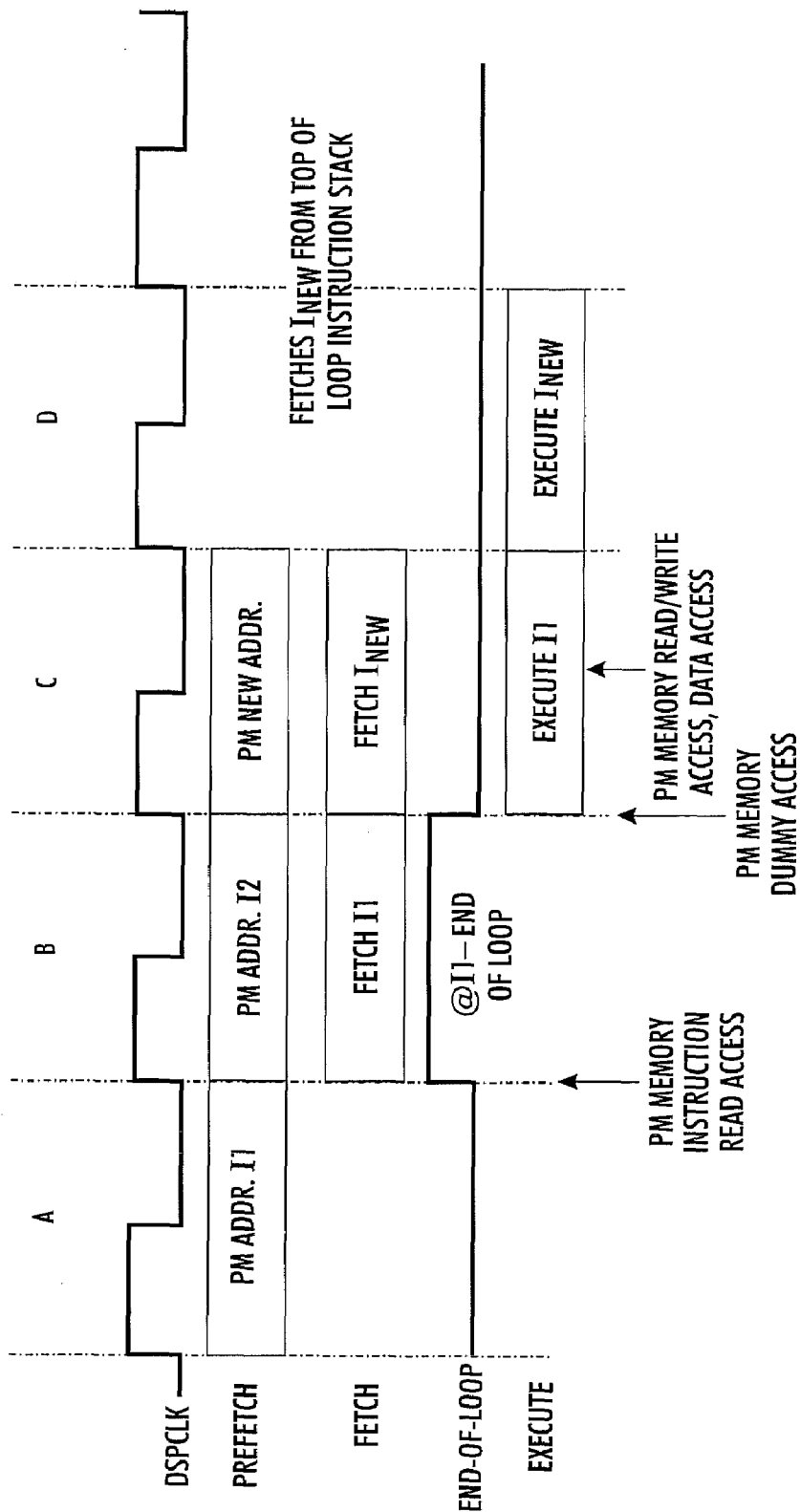
FIG. 8 is a timing diagram illustrating program count discontinuity End of Loop to Top of Loop instruction reads according to the concepts of the present invention.

FIG. 8 illustrates an example of the timing for the situation where the program count discontinuity is an END-OF-LOOP discontinuity. As shown in FIG. 8, during cycle A, PMAddressI1 for instruction I1 is made available. Thereafter, during cycle B, the PMAddressI2 for instruction I2 is made available, and the PM instruction read access for instruction I1 is performed wherein the PM instruction read access is triggered upon the rising edge of the DSP core clock signal at the beginning of cycle B. Also, during cycle B, an End-of-Loop signal goes HIGH indicating an end-of-loop situation.

During cycle C, as shown in FIG. 8, PMNewAddress is made available, and a PM memory dummy access is triggered upon the rising edge of the DSP core clock signal at the beginning of cycle C, due to an end-of-loop conditional program count discontinuity. Also, due to the end-of-loop conditional program count discontinuity, during cycle C, a PM memory read/write access, data access is performed wherein the PM access is triggered upon the falling edge of the DSP core clock signal, and the instruction I1 is executed. During cycle D, the instruction Inew is executed.

Figure 9:
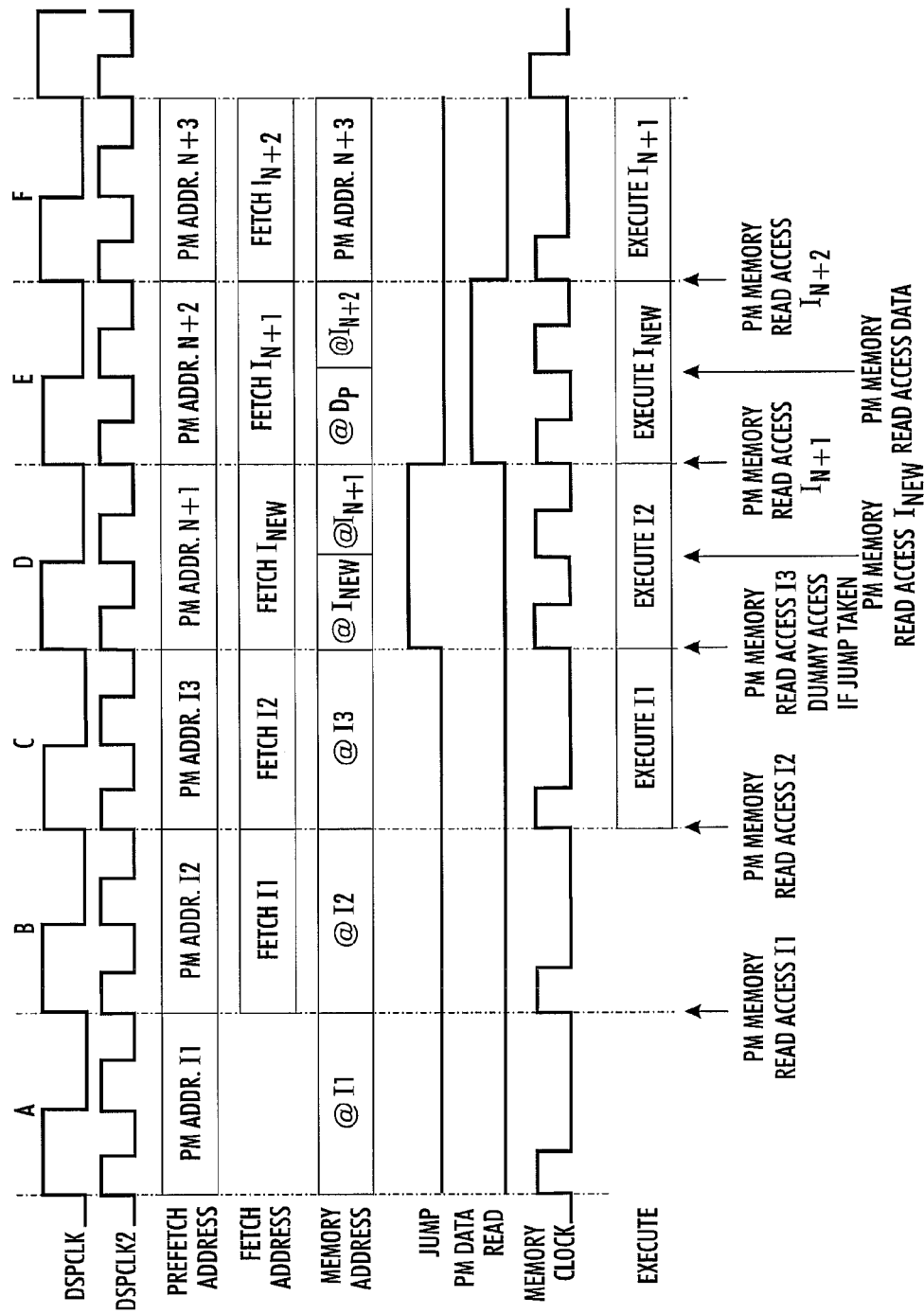
FIG. 9 illustrates pipeline and program memory busses for near-by memory according to the concepts of the present invention.

FIG. 9 illustrates another example of the timing for the memory accesses according to the concepts of the present invention. As shown in FIG. 9, during cycle A, PMAddressI1 for instruction I1 is made available as the prefetch address. Thereafter, during cycle B, the PMAddressI2 for instruction I2 is made available as the prefetch address, and the PM instruction read access for instruction I1 is performed wherein the PM instruction read access is triggered upon the rising edge of the DSP core clock signal at the beginning of cycle B.

During cycle C, as shown in FIG. 9, the PMAddressI3 for instructionl I3 is made available as the prefetch address, and the PM instruction read access for instruction I2 is performed wherein the PM instruction read access is triggered upon the rising edge of the DSP core clock signal at the beginning of cycle C. Lastly, during cycle C, instruction I1 is executed.

During cycle D, a jump signal goes HIGH indicating a jump situation, and PMAddressN+1 is made available as the prefetch address. Also, during cycle D, the fetch address is the address for instruction Inew, and a PM memory dummy access is triggered upon the rising edge of the DSP core clock signal at the beginning of cycle D, due to the jump instruction. Further, due to the instruction, during cycle D, the PM instruction read access for instruction Inew is performed wherein the PM instruction read access is triggered upon the falling edge of the DSP core clock signal or triggered upon the second rising edge of the memory clock signal within the period of cycle D, and the instruction I2 is executed. Lastly, during cycle D, the memory address is initially the address for instruction Inew, but at the second rising edge of the memory clock signal, the memory address changes to the address for the $I_{N+1}$ instruction.

During cycle E, PMAddresssN+2 is made available as the prefetch address. Also, during cycle E, the fetch address is the address for instruction $I_{N+1}$, and a PM memory read access for instruction $I_{N+1}$ is triggered upon the rising edge of the DSP core clock signal at the beginning of cycle E. Further, during cycle E, the PM instruction read access for instruction $I_{N+2}$ is performed wherein the PM instruction read access is triggered upon the falling edge of the DSP core clock signal or triggered upon the second rising edge of the memory clock signal within the period of cycle E, and the instruction Inew is executed. Lastly, during cycle E, the memory address is initially the address for the data access, but at the second rising edge of the memory clock signal, the memory address changes to the address for the $I_{N+2}$ instruction.

During cycle F, PMAddressN+3 is made available as the prefetch address. Also, during cycle F, the fetch address is the address for instruction $I_{N+2}$, and a PM memory read access for instruction $I_{N+2}$ is triggered upon the rising edge of the DSP core clock signal at the beginning of cycle F. The instruction $I_{N+1}$ is executed during cycle F.

Figure 10:
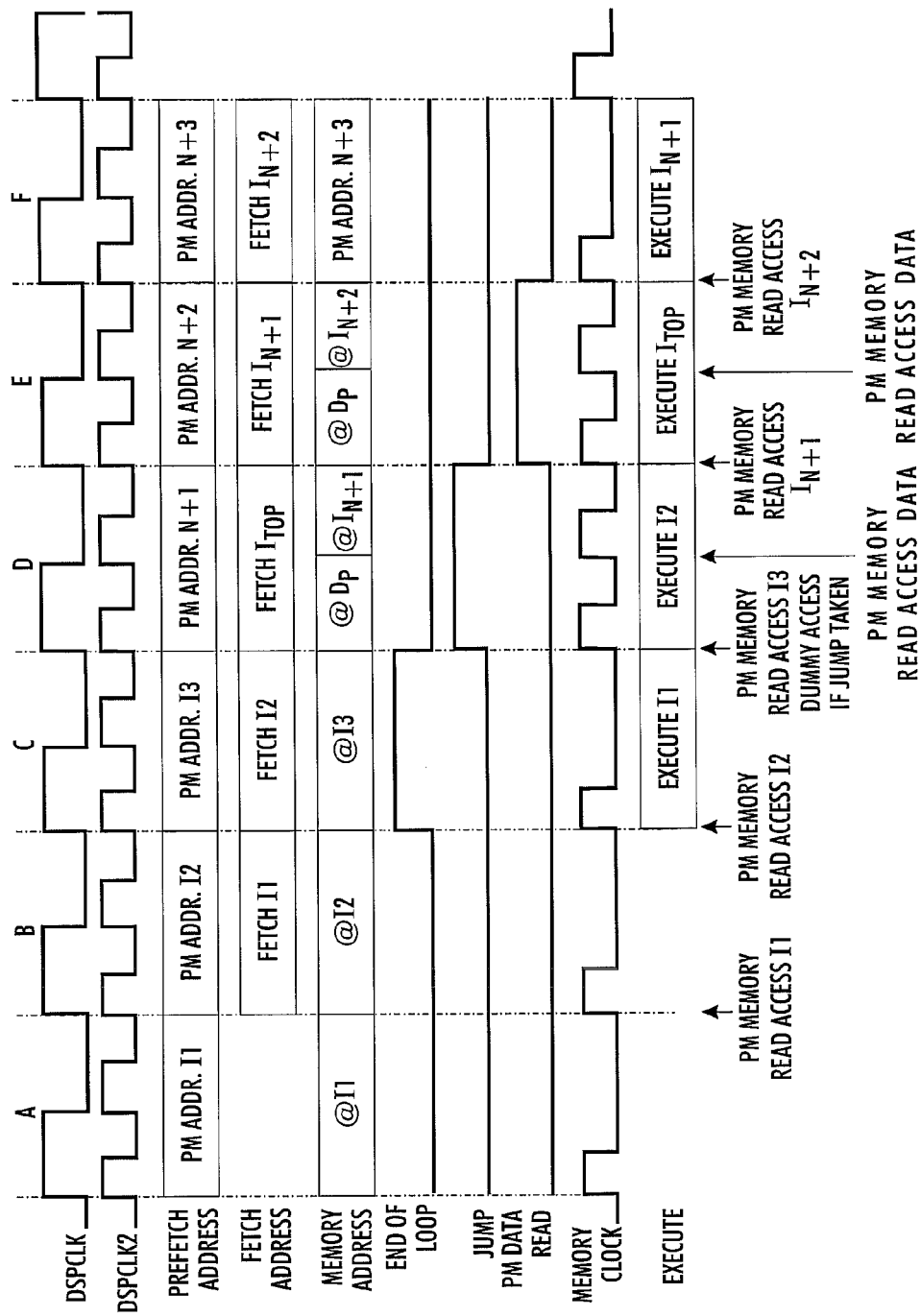
FIG. 10 illustrates pipeline and program memory busses for near-by memory for an End of Loop instruction according to the concepts of the present invention.

FIG. 10 illustrates an example of the timing for the memory accesses according to the concepts of the present invention. As shown in FIG. 10, during cycle A, PMAddresssI1 for instruction I1 is made available as the prefetch address. Thereafter, during cycle B, the PMAddressI2 for instruction I2 is made available as the prefetch address, and the PM instruction read access for instruction I1 is performed wherein the PM instruction read access is triggered upon the rising edge of the DSP core clock signal at the beginning of cycle B.

During cycle C, as shown in FIG. 10, an end-of-loop signal goes HIGH, and the PMAddressI3 for instruction I3 is made available as the prefetch address. The PM instruction read access for instruction I2 is performed wherein the PM instruction read access is triggered upon the rising edge of the DSP core clock signal at the beginning of cycle C. Lastly, during cycle C, instruction I1 is executed.

During cycle D, a jump signal goes HIGH, and PMAddressN+1 is made available as the prefetch address. Also, during cycle D, the fetch address is the address for instruction Itop wherein Itop is the instruction from the Top-of-Loop. A PM memory dummy access is triggered upon the rising edge of the DSP core clock signal at the beginning of cycle D if a jump is taken, or if no jump is taken, a PM memory read access for instruction I3 is triggered upon the rising edge of the DSP core clock signal at the beginning of cycle D. Further, during cycle D, the data from a PM memory read access is fetched wherein the PM data read access is triggered upon the falling edge of the DSP core clock signal or triggered upon the second rising edge of the memory clock signal within the period of cycle D, and the instruction I2 is executed. Lastly, during cycle D, the memory address is initially the address for a data access, but at the second rising edge of the memory clock signal, the memory address changes to the address for the $I_{N+1}$ instruction.

During cycle E, PMAddressN+2 is made available as the prefetch address. Also, during cycle E, the fetch address is the address for instruction $I_{N+1}$, and a PM memory read access for instruction $I_{N+1}$ is triggered upon the rising edge of the DSP core clock signal at the beginning of cycle E. Further, during cycle E, the data from a PM memory read access is fetched wherein the PM data read access is triggered upon the falling edge of the DSP core clock signal or triggered upon the second rising edge of the memory clock signal within the period of cycle E, and the instruction Itop is executed. Lastly, during cycle E, the memory address is initially the address for a data access, but at the second rising edge of the memory clock signal, the memory address changes to the address for the $I_{N+2}$ instruction.

During cycle F, PMAddressN+3 is made available as the prefetch address. Also, during cycle F, the fetch address is the address for instruction $I_{N+2}$, and a PM memory read access for instruction $I_{N+2}$ is triggered upon the rising edge of the DSP core clock signal at the beginning of cycle F. The instruction $I_{N+1}$ is executed during cycle F.

Figure 11:
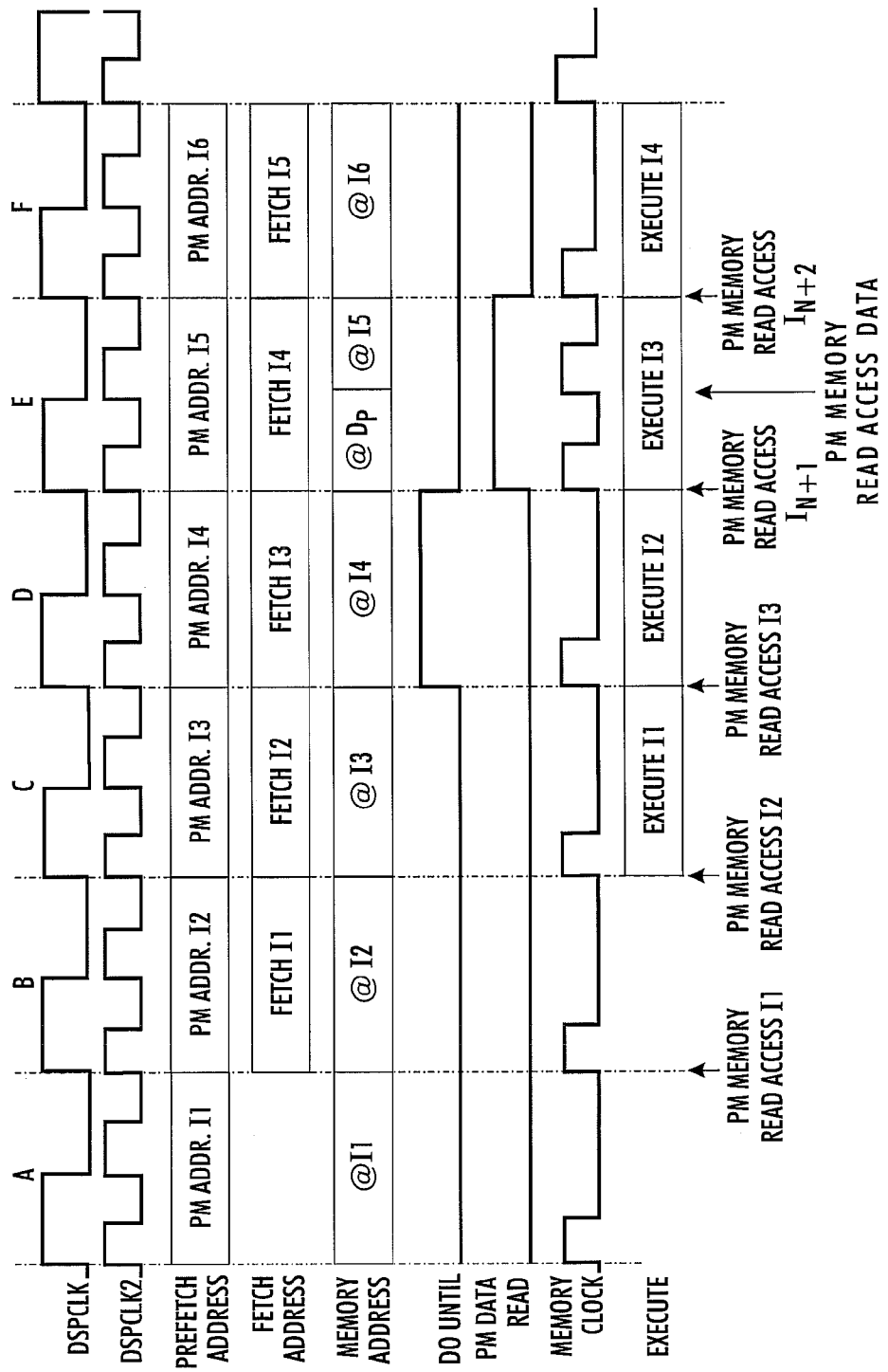
FIG. 11 illustrates pipeline and program memory busses for near-by memory for a Start of Loop, DO UNTIL instruction according to the concepts of the present invention.

FIG. 11 illustrates a further example of the timing for the memory accesses according to the concepts of the present invention. As shown in FIG. 11, during cycle A, PMAddressI1 for instruction I1 is made available as the prefetch address. Thereafter, during cycle B, the PMAddressI2 for instruction I2 is made available as the prefetch address, and the PM instruction read access for instruction I1 is performed wherein the PM instruction read access is triggered upon the rising edge of the DSP core clock signal at the beginning of cycle B. It is noted that in this example the instruction I2 is a DO UNTIL instruction, and at the end of executing I2, the instruction I3 is pushed into the top of loop instruction stack.

During cycle C, as shown in FIG. 11, the PMAddressI3 for instruction I3 is made available as the prefetch address, and the PM instruction read access for instruction I2 is performed wherein the PM instruction read access is triggered upon the rising edge of the DSP core clock signal at the beginning of cycle C. Lastly, during cycle C, instruction I1 is executed.

During cycle D, a DO UNTIL signal goes HIGH, and PMAddressI4 is made available as the prefetch address. Also, during cycle D, the fetch address is the address for instruction I3, and a PM memory access for instruction I3 is triggered upon the rising edge of the DSP core clock signal at the beginning of cycle D. Further, the instruction I2 is executed.

During cycle E, PMAddressI5 is made available as the prefetch address. Also, during cycle E, and the fetch address is the address for instruction I4. However, due to the DO UNTIL instruction, a PM memory read access for instruction $I_{N+1}$ is triggered upon the rising edge of the DSP core clock signal at the beginning of cycle E. Further, during cycle E, a PM memory read access is fetched wherein the PM data read access is triggered upon the falling edge of the DSP core clock signal or triggered upon the second rising edge of the memory clock signal within the period of cycle E, and the instruction I3 is executed.

During cycle F, PMAddressI6 is made available as the prefetch address. Also, during cycle F, the fetch address is the address for instruction I5, and a PM memory read access for instruction $I_{N+2}$ is triggered upon the rising edge of the DSP core clock signal at the beginning of cycle F. The instruction I4 is executed during cycle F.

Figure 12:
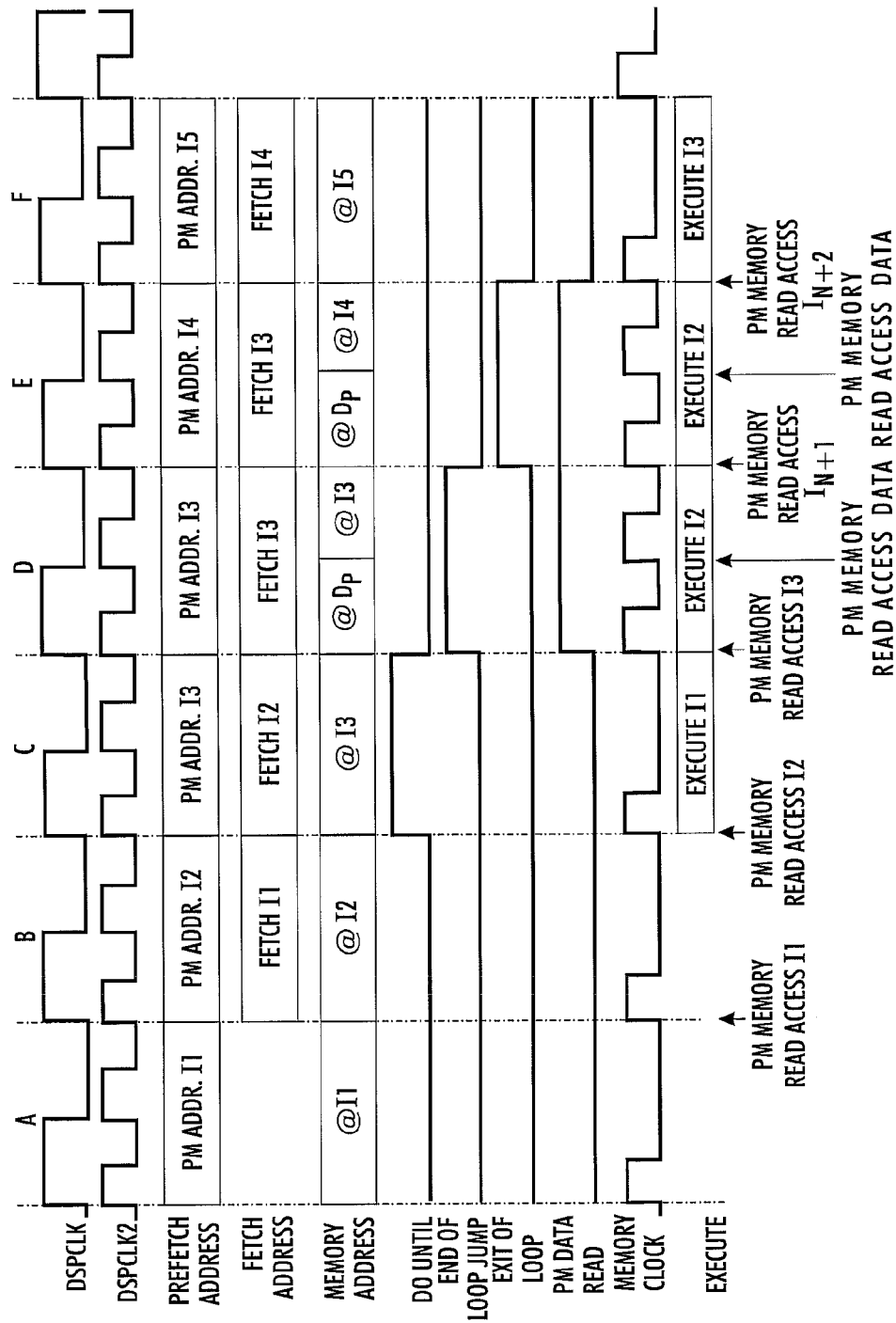
FIG. 12 illustrates pipeline and program memory busses for near-by memory for a single instruction loop according to the concepts of the present invention.

FIG. 12 illustrates another example of the timing for the memory accesses according to the concepts of the present invention. As shown in FIG. 12, during cycle A, PMAddressI1 for instruction I1 is made available as the prefetch address. It is noted that in this example the instruction I1 is a DO UNTIL instruction, and at the end of executing I1, the instruction I2 is pushed into the top of loop instruction stack.

Thereafter, during cycle B, the PMAddressI2 for instruction I2 is made available as the prefetch address, and the PM instruction read access for instruction I1 is performed wherein the PM instruction read access is triggered upon the rising edge of the DSP core clock signal at the beginning of cycle B.

During cycle C, as shown in FIG. 12, a DO UNTIL signal goes HIGH, the PMAddressI3 for instruction I3 is made available as the prefetch address, and the PM instruction read access for instruction I2 is performed wherein the PM instruction read access is triggered upon the rising edge of the DSP core clock signal at the beginning of cycle C. Lastly, during cycle C, instruction I1 is executed.

During cycle D, an end-of-loop jump signal goes HIGH, and PMAddressI3 is made available as the prefetch address. Also, during. cycle D, the fetch address is the address for instruction I3, and a PM memory access for instruction I3 is triggered upon the rising edge of the DSP core clock signal at the beginning of cycle D. Further, during cycle D, a PM memory read access is fetched wherein the PM data read access is triggered upon the falling edge of the DSP core clock signal or triggered upon the second rising edge of the memory clock signal within the period of cycle D, and the instruction I2 is executed.

During cycle E, PMAddressI4 is made available as the prefetch address. Also, during cycle E, the fetch address is the address for instruction I3, and a PM memory read access for instruction $I_{N+1}$ is triggered upon the rising edge of the DSP core clock signal at the beginning of cycle E. Further, during cycle E, a PM memory read access is fetched wherein the PM data read access is triggered upon the falling edge of the DSP core clock signal or triggered upon the second rising edge of the memory clock signal within the period of cycle E, and the instruction I2 is executed.

During cycle F, PMAddressI5 is made available as the prefetch address. Also, during cycle F, the fetch address is the address for instruction I4, and a PM memory read access for instruction $I_{N+2}$ is triggered upon the rising edge of the DSP core clock signal at the beginning of cycle F. The instruction I3 is executed during cycle F.

Figure 15:
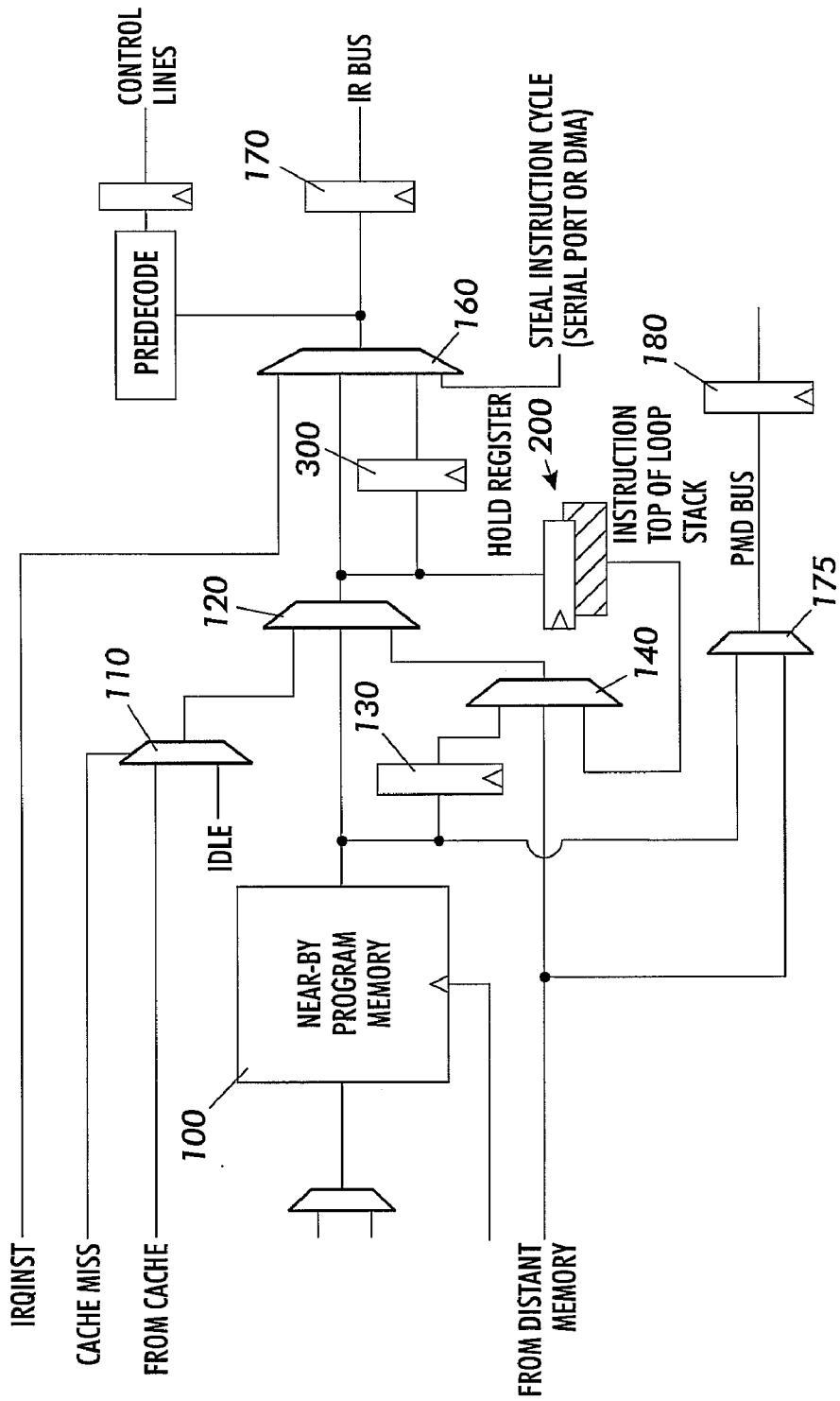
FIG. 15 illustrates the logic circuitry for a program memory interface according to the concepts of the present invention.

According to a preferred embodiment of the present invention, the Top-Of-Loop instruction buffer 200 of FIG. 15 should be loaded with the instruction just following the DO UNTIL instruction. This creates a dependency between two instructions as the instruction following the DO UNTIL instruction must be available (fetch completed) before the end of the execute phase of the DO UNTIL. In case of cache miss (insertion of an IDLE instruction) or interrupt (insertion of Interrupt cycle), this presents a difficulty as the instruction may not be available on time and the information that a DO UNTIL was performed may be lost.

Regarding a cache miss, the DO UNTIL Instruction completes is execution before the instruction following the DO UNTIL is available. While this instruction is being fetched, it is replaced by an IDLE instruction. When the cache is filled, the instruction becomes available and must be pushed into the Top Of Loop Stack. To do that, a flag must indicate that a DO UNTIL instruction was just performed.

Regarding interrupts, two solutions are possible. One solution is to disable interrupts as long as the instruction fetch after a DO UNTIL is not completed. This allows loading the correct instruction in the Top-Of-Loop instruction buffer after the cache has provided the correct instruction. A second solution is to add one status bit as part of the stack so that after an interrupt, if the instruction is fetched again, the status bit indicates that the instruction must be pushed into the top of loop instruction stack. In this second case, there is a software restriction: the ISR code cannot jump to a top of loop (instruction following the DO UNTIL). The second solution is preferred as this keeps from adding a new concept of interrupt disabled based on particular instruction being executed.

In the preferred embodiment of the present invention, the DSP core 11 receives 2 clocks signals, DSPCLK and DSPCLK2. The DSPCLK2 clock signal runs at twice the frequency and is used only to generate clock and control lines going to the near-by PM memory blocks. If the cache needs double access per cycle, the double frequency clock of the DSPCLK2 signal is used to trigger the cache memory accesses.

In case of wait states (Software or hardware) or a CPU hold-off due to contentions at the interfaces, the DSP clocks are stopped to prevent the pipeline from moving forward before the current bus transactions are completed. The clocks are stopped in a low state, and when the clocks are restarted, the next rising edge of the signals is the boundary to a new pipeline state.

Figure 16:
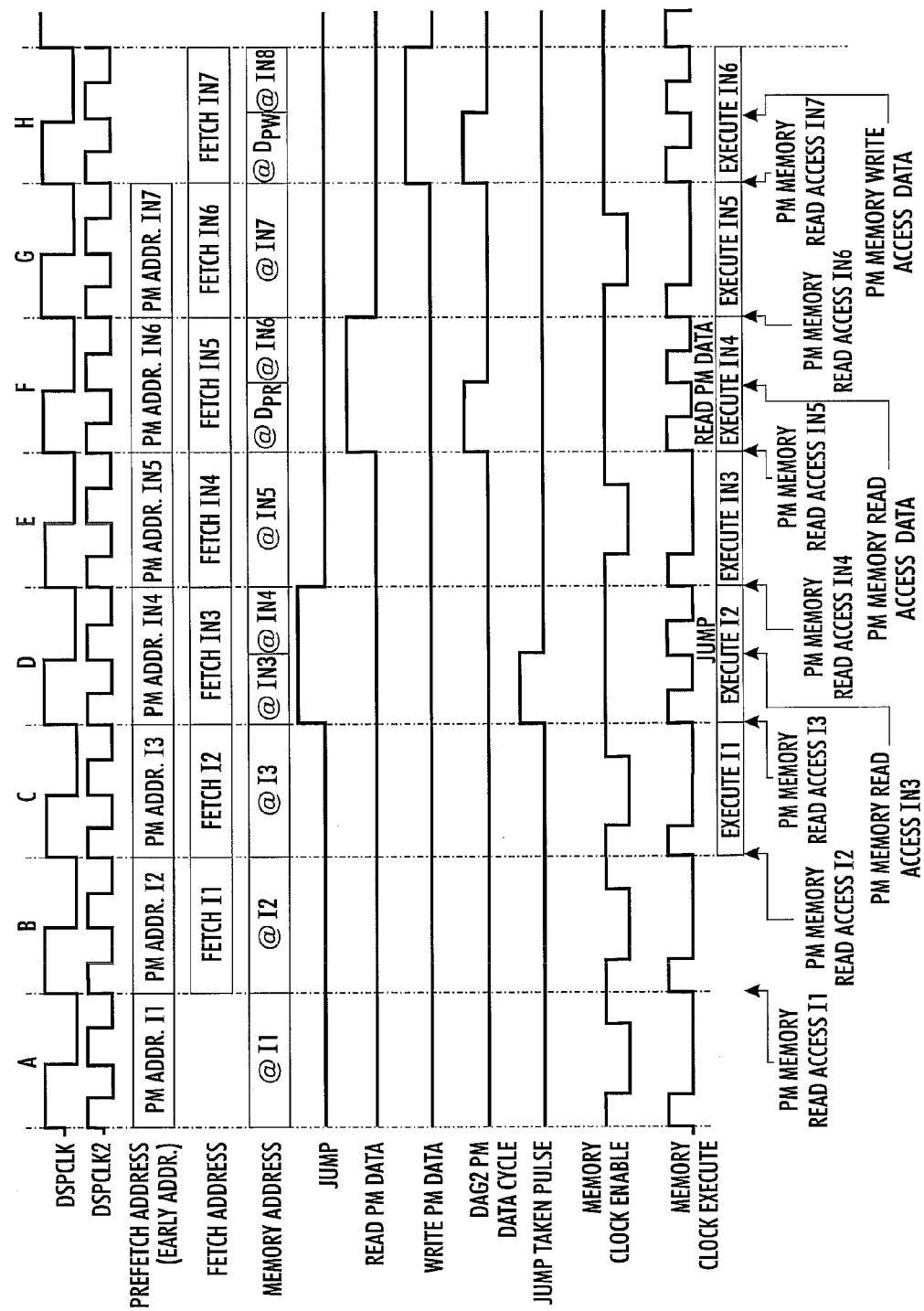
FIG. 16 illustrates pipeline and program memory busses for near-by memory, program memory and accesses according to the concepts of the present invention.

FIG. 16 illustrates another example of the timing for the memory accesses according to the concepts of the present invention. As shown in FIG. 16, during cycle A, PMAddressI1 for instruction I1 is made available as the prefetch address.

Thereafter, during cycle B, the PMAddressI2 for instruction I2 is made available as the prefetch address, and the PM instruction read access for the instruction I1 is performed wherein the PM instruction read access is triggered upon the rising edge of the DSP core clock signal at the beginning of cycle B.

During cycle C, as shown in FIG. 16, the PMAddressI3 for instruction I3 is made available as the prefetch address, and the PM instruction read access for the instruction I2 is performed wherein the PM instruction read access is triggered upon the rising edge of the DSP core clock signal at the beginning of cycle C. Lastly, during cycle C, instruction I1 is executed.

During cycle D, a jump signal goes HIGH, and PMAddressIN4 is made available as the prefetch address. Also, during cycle D, a PM memory access for instruction I3 is triggered upon the rising edge of the DSP core clock signal at the beginning of cycle D. Further, during cycle D, due to the jump signal going HIGH, a PM memory read access for instruction IN3 is performed wherein the PM data read access is triggered upon the falling edge of the DSP core clock signal or triggered upon the second rising edge of the memory clock signal within the period of cycle D, and the instruction I2 is executed. It is noted that during cycle D, the memory clock enable signal remains HIGH throughout the entire cycle to enable two memory accesses during the cycle, thereby enabling the PM memory read access of I3 and the PM memory read access of IN3.

During cycle E, PMAddressIN5 is made available as the prefetch address. Also, during cycle E, the fetch address is the address for instruction IN4, and a PM memory read access for instruction IN4 is triggered upon the rising edge of the DSP core clock signal at the beginning of cycle E. Further, during cycle E, the instruction IN3 is executed.

During cycle F, a Read PM data signal goes HIGH, a DAG2 PM data cycle signal is pulsed HIGH, and PMAddressIN6 is made available as the prefetch address. Also, during cycle F, a PM memory access for instruction IN5 is triggered upon the rising edge of the DSP core clock signal at the beginning of cycle F. Further, during cycle D, due to the Read PM data signal going HIGH, a PM memory read access for data is performed wherein the PM data read access is triggered upon the falling edge of the DSP core clock signal or triggered upon the second rising edge of the memory clock signal within the period of cycle F, and the instruction IN4 is executed. It is noted that during cycle F, the memory clock enable signal remains HIGH throughout the entire cycle to enable two memory accesses during the cycle, thereby enabling the PM memory read access of IN5 and the PM memory read access of Data.

During cycle G, PMAddressIN7 is made available as the prefetch address. Also, during cycle G, the fetch address is the address for instruction IN6, and a PM memory read access for instruction IN6 is triggered upon the rising edge of the DSP core clock signal at the beginning of cycle G. The instruction IN5 is executed during cycle G.

During cycle H, a Write PM data signal goes HIGH and a DAG2 PM data cycle signal is pulsed HIGH. Also, during cycle H, a PM memory access for instruction IN7 is triggered upon the rising edge of the DSP core clock signal at the beginning of cycle H. Further, during cycle H, due to the Write PM data signal going HIGH, a PM memory write access for data is performed wherein the PM data read access is triggered upon the falling edge of the DSP core clock signal or triggered upon the second rising edge of the memory clock signal within the period of cycle H, and the instruction IN6 is executed. It is noted that during cycle H, the memory clock enable signal remains HIGH throughout the entire cycle to enable two memory accesses during the cycle, thereby enabling the PM memory read access of IN7 and the PM memory write access of Data.

Figure 17:
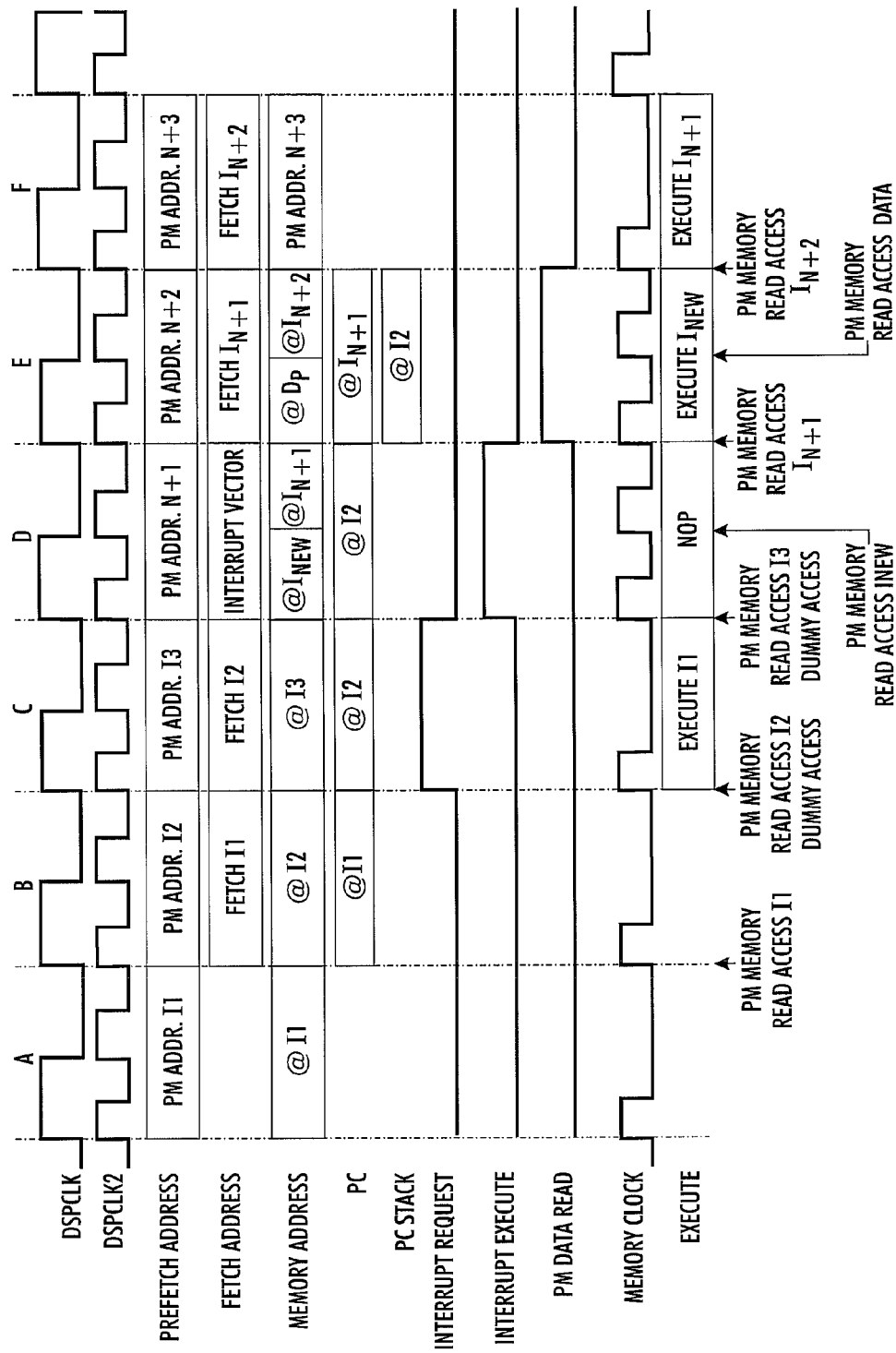
FIG. 17 illustrates pipeline and program memory busses for near-by memory for an interrupt taken in place of executing instruction I2 according to the concepts of the present invention.

FIG. 17 illustrates another example of the timing for the memory accesses according to the concepts of the present invention. As shown in FIG. 17, during cycle A, PMAddressI1 for instruction I1 is made available as the prefetch address.

Thereafter, during cycle B, the PMAddressI2 for instruction I2 is made available as the prefetch address, the program count corresponds to instruction I1, and the PM instruction read access for the instruction I1 is performed wherein the PM instruction read access is triggered upon the rising edge of the DSP core clock signal at the beginning of cycle B.

During cycle C, as shown in FIG. 16, the PMAddressI3 for instruction I3 is made available as the prefetch address, an interrupt request signal goes HIGH, the program count corresponds to instruction I2, and the PM instruction read access dummy access for the instruction I2 is performed wherein the PM instruction read access dummy access is triggered upon the rising edge of the DSP core clock signal at the beginning of cycle C. Lastly, during cycle C, instruction I1 is executed.

During cycle D, an interrupt execute signal goes HIGH, PMAddressN+1 is made available as the prefetch address, the program count corresponds to instruction I2, and the fetch address is the interrupt vector. Also, during cycle D, a PM memory access dummy access for instruction I3 is triggered upon the rising edge of the DSP core clock signal at the beginning of cycle D. Further, during cycle D, due to the interrupt execute signal going HIGH, a PM memory read access for instruction Inew is performed wherein the PM data read access is triggered upon the falling edge of the DSP core clock signal or triggered upon the second rising edge of the memory clock signal within the period of cycle D, the memory address corresponds to the instruction Inew during a first half of cycle D and corresponds to the instruction $I_{N+1}$ during a second half of cycle D, and no instruction is executed (NOP).

During cycle E, a PM data read signal goes HIGH, PMAddressN+2 is made available as the prefetch address, the program count corresponds to instruction $I_{N+1}$, the program stack corresponds to the instruction I2, and the fetch address corresponds to instruction $I_{N+1}$. Also, during cycle E, a PM memory access for instruction $I_{N+1}$ is triggered upon the rising edge of the DSP core clock signal at the beginning of cycle E. Further, during cycle E, a PM memory read access for data is performed wherein the PM data read access is triggered upon the falling edge of the DSP core clock signal or triggered upon the second rising edge of the memory clock signal within the period of cycle E, the memory address corresponds to the data during a first half of cycle E and corresponds to the instruction $I_{N+2}$ during a second half of cycle D, and the instruction Inew is executed.

During cycle F, PMAddressN+3 is made available as the prefetch address. Also, during cycle F, the fetch address is the address for instruction $I_{N+2}$, and a PM memory read access for instruction $I_{N+2}$ is triggered upon the rising edge of the DSP core clock signal at the beginning of cycle F. Further, during cycle F, the instruction $I_{N+1}$ is executed.

With respect to FIG. 16, when executed, Interrupts take one pipe slat in place of a functional instruction. The Interrupt pushes values into the stacks (PC stack and Status stack) and changes the PC/instruction fetch address. The value pushed into the stack is the program memory address from the previous instruction fetch (the fetch that was performed before the interrupt is executed, this fetched instruction is discarded and not executed since it is replaced by the interrupt).

Figure 13:
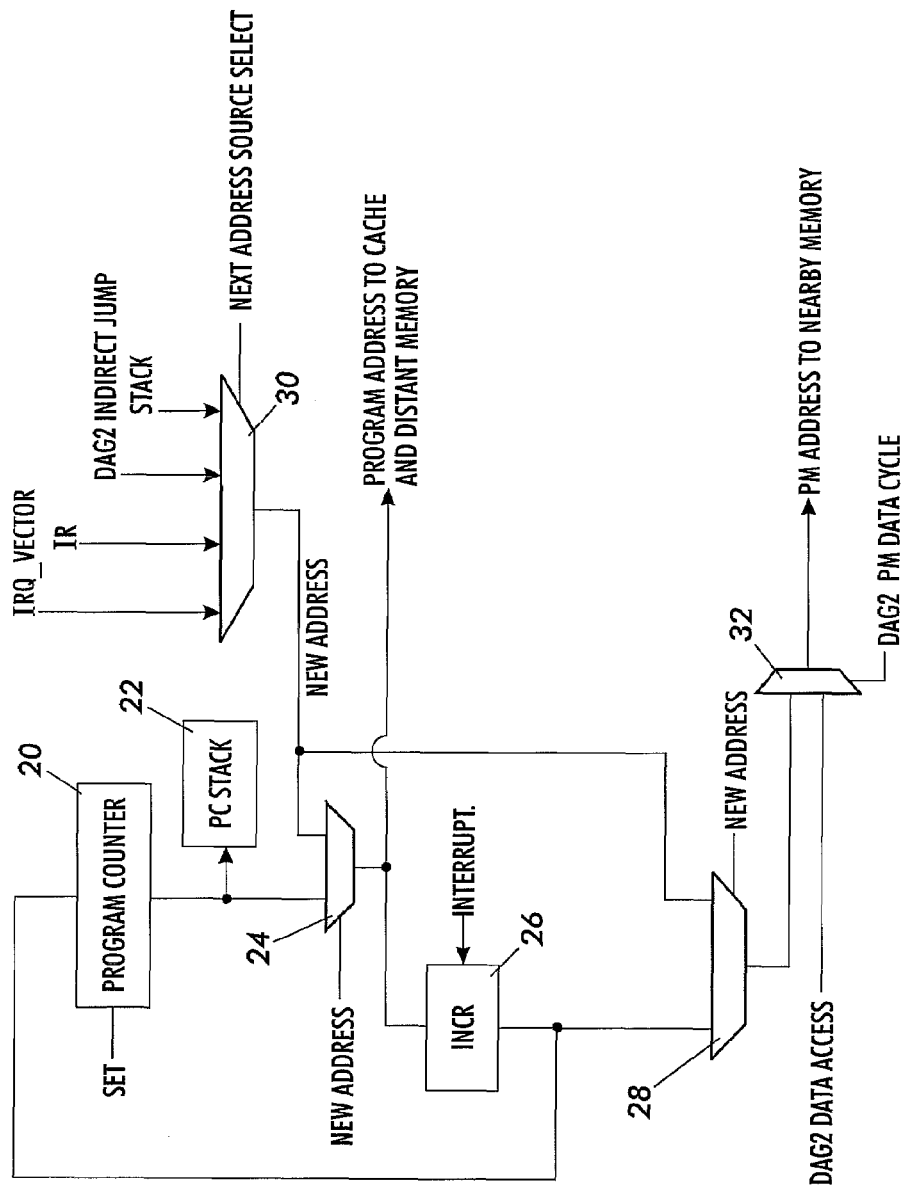
FIG. 13 illustrates a program address generation circuit according to the concepts of the present invention.

In the case where the interrupt occurs just after a PC discontinuity, the new PC address is pushed into the cache (JUMP, CALL, RETURN target address, Top of Loop address, Interrupt Vector address). In a case of a Top-of-Loop discontinuity, at the return for ISR, the Top-of-Loop instruction will be fetched even though not necessary since it is already stored in the Top-of-Loop instruction stack FIG. 13 illustrates an example of a preferred embodiment of the circuitry used to generate the PM addresses according to the concepts of the present invention. As shown in FIG. 13, the PM memory interface consists of 3 different sets of buses (address and data) for each PM memory type: PM near-by, PM distant or PM cache. In the preferred embodiment, only the near-by memory can perform a pre-fetch and therefore uses the early program address. Moreover, a program counter 20 produces the program count (PC) that is fed to a multiplexer 24 and a PC stack 22.

The multiplexer 24 selects between the PC from program counter 20 or the address from multiplexer 30 based upon the state of a New Address signal (jump taken). The multiplexer 30 selects one of four potential addresses: IRQ_vector, IR, DAG2 Indirect Jump, or stack; based upon the state of a next address source select signal.

The address from multiplexer 24 is used as the program address for the cache or the distant program memory. The address from multiplexer 24 is also fed to an incrementing circuit 26 where the address is incremented based upon the state of an interrupt signal. The address (PC+1/+0) from the incrementing circuit 26 (incremented or not) is fed to multiplexer 28 that selects between the address from multiplexer 30 and the address from the incrementing circuit 26 based upon the state of a New Address signal (jump taken).

Lastly, the selected address from multiplexer 28 is fed to multiplexer 32 that selects between the address from multiplexer 28 and the address DAG2 (500 in FIG. 18) based upon the state of a DAG2 PM data cycle signal.

As illustrated in FIG. 13, the generation of the PM near-by address is chosen from 3 sources: a Data Address Generation circuit 2 (DAG2) (500 in FIG. 18) for a PM data access, an address selected by a new instruction fetch address multiplexer 30 (in case of a PC discontinuity), or a PC+1/+0 value generated by an incrementing circuit 26.

If the source of the PM near-by address is either from the DAG2 for a PM data access or the address selected by the new instruction fetch address multiplexer 30, access to the memory is done on the falling edge of the DSPCLK clock signal.

If the PM near-by address is the PC+1 value generated by an incrementing circuit 26, access is done on the rising edge of the DSPCLK clock signal.

It is noted that the DAG2 address is PM address source in two cases: indirect jump and PM data access. Thus, in the preferred embodiment, to simplify the multiplexer complexity, the DAG2 address is connected to the circuit at a single place.

Figure 14:
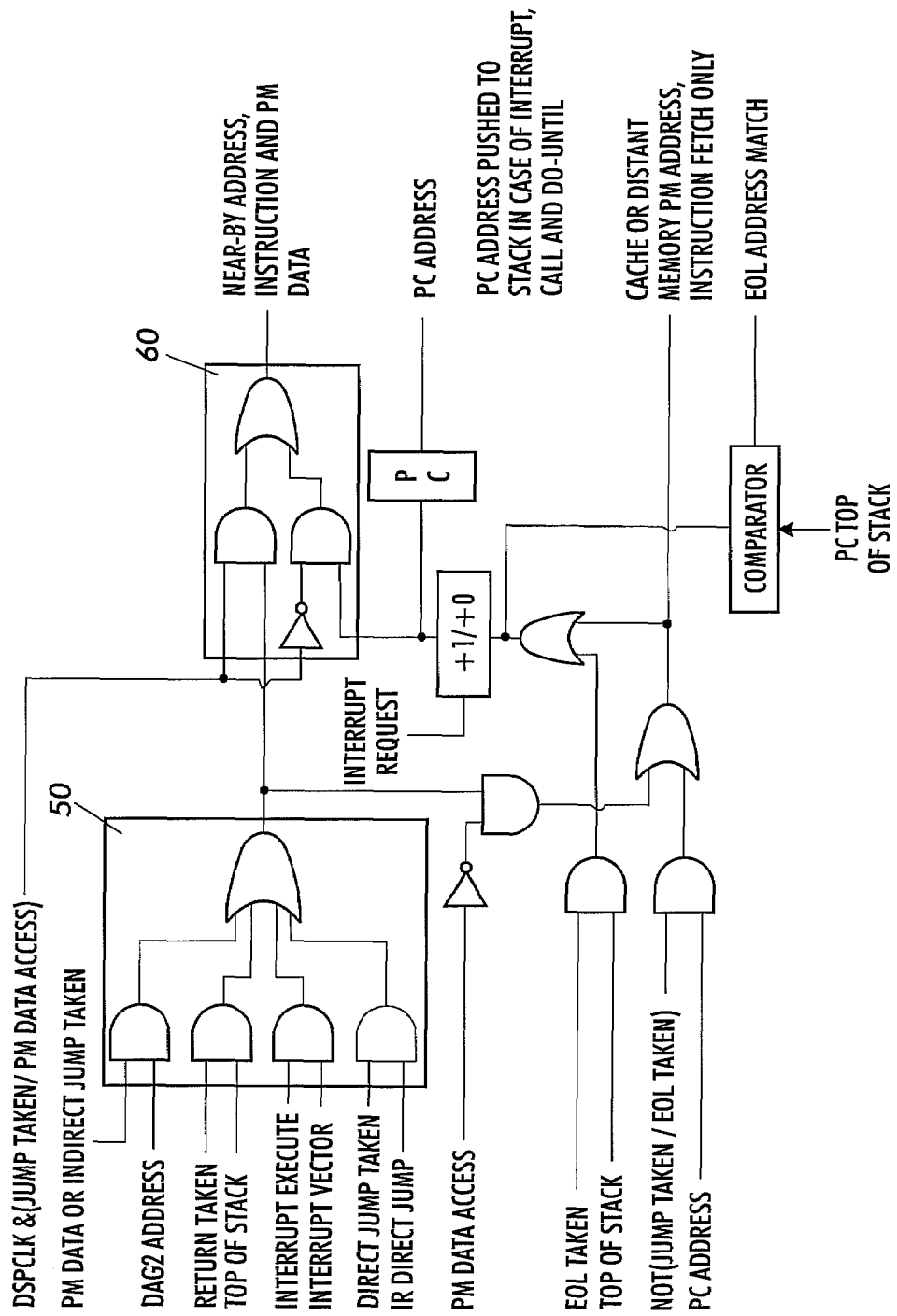
FIG. 14 illustrates circuit logic for a program memory address generation circuit according to the concepts of the present invention.

FIG. 14 illustrates logic for the program memory address generation. As illustrated in FIG. 14, a program count discontinuity event determination circuit 50 receives a plurality of inputs representing certain events. Predetermined events are ANDed together to generate signals representing whether a program count discontinuity event exists or not. For example, as illustrated in FIG. 14, a signal representing either a program memory data access or an indirect jump taken is ANDed with a signal representing generation of an address from Data Address Generation2 circuit to generate a signal representing whether a program count discontinuity event exists or not. The various signals from the parallel AND circuits are ORed to generate a signal representing whether a program count discontinuity event exists or not.

As further illustrated in FIG. 14, the ORed signal representing whether a program count discontinuity event exists or not is ANDed with a not program memory data access signal to produce a signal that represents whether a cache or distant memory program memory address exists or not for an instruction fetch only situation. FIG. 14 also illustrates that a not jump or end of loop taken signal ANDed with a signal representing a program code address produces a signal that represents whether a cache or distant memory program memory address exists or not for an instruction fetch only situation.

Lastly, as illustrated in FIG. 14, a near-by program memory address determination circuit 60 receives a plurality of inputs to use to determine if the address is for a near-by program memory. For example, as illustrated in FIG. 14, if a program count discontinuity exists, as determined by the program count discontinuity event determination circuit 50, and a signal representing the digital signal processor clock ANDed with an ORed signal of the jump taken signal and a program memory data access signal are both HIGH, the near-by program memory address determination circuit 60 produces a signal indicating that the address is for the near-by program memory.

The circuitry of FIG. 14 also addresses the situation where upon an end of loop situation, the program count (PC) must move to the top of loop+1, but at the same time a program memory (PM) data instruction may be in the execution phase. Since the top of loop instruction has not been fetch from memory (taken from the Instruction Top-Of-Loop Stack instead), the PC and PM address are updated for the next instruction fetch, top-of-loop+1.

As noted above, with respect to FIG. 14, the jump address (in case of PC discontinuity} is generated from an AND/OR function. If no discontinuity event is active, the jump address is driven LOW. It is further noted that the cache PM address is driven LOW when an EOL is taken. No instruction fetch is requested in this case.

In case of a JUMP, CALL, and RETURN instruction at the end of the loop, this takes priority over the EOL condition. In other words, if the JUMP condition is true, the JUMP is executed, but not the end of loop. In such a circumstance, EOL taken is as true if the EOL condition is detected and no jump is taken.

It is noted, as illustrated in FIG. 14, that when executing a DO UNTIL instruction, the top of stack used as one entry to the address comparator is the address being pushed into the stack.

As noted above, FIG. 15 illustrates logic circuitry for a program memory interface according to the concepts of the present invention. In the example of FIG. 15, the circuitry includes an instruction top of loop stack 200 and an instruction-hold register 300. The top of loop instruction stack 200 enables all instructions that occur at the end of the loop to be executed without adding cycles to the process. The top of loop instruction stack 200 removes the need to fetch the next instruction at a time where there may be a program memory data access and/or a program counter discontinuity.

The use of the top of loop instruction stack 200, according to the concepts of the present invention, takes advantage of the fact that the program counter discontinuity is know in advance. This enables the present invention to save the first instruction of the loop, upon the entry into the loop, in the top of loop instruction stack 200 so that the instruction is available for later use. This suppresses the need for a program memory read cycle at a later cycle upon an end of loop discontinuity. Lastly, the instruction-hold register 300 is for temporarily storing the instruction values.

FIG. 15 further illustrates other logic components; such as a data multiplexer 175, first instruction multiplexer 120, second instruction multiplexer 140, and third instruction multiplexer 160 which enable the double memory access per cycle to occur without collision or program discontinuity. It is noted that the first and second instruction multiplexers 120 and 140 can be combined to form a single instruction multiplexer. The various logic components function to create pathway for the information that is be presented on either the program memory data bus (PMD bus) and/or instruction register bus (IR bus). This information is information that has been read from either a near-by program memory 100 or a distant memory. Moreover, this information can be of two types: data or instruction (program).

If the information is of the data type, the information will go on PMD bus, through the data multiplexer 175, to be input to register 180. The data multiplexer 175 is controlled by the decoding of the address for a read transaction so that the source of the data is properly selected from either a distant or near by memory block.

If the information is an instruction, the instruction has to be forwarded to the correct place depending on the type of instruction fetch. There are two types of instruction fetches: early fetch or pre-fetch from a near-by memory block and a normal fetch from cache or a distant memory or from a near-by memory in the case of a discontinuity.

The first instruction multiplexer 120 and the second instruction multiplexer 140 combine together to generate the instruction from the program to be executed next. As noted before, the first and second instruction multiplexers 120 and 140 can be combined to form a single instruction multiplexer to generate the instruction from the program to be executed next.

The second instruction multiplexer 140 selects an instruction value from the top of loop instruction stack 200, an instruction value from the near-by program memory 100, or an instruction value selected by multiplexer 110.

The first instruction multiplexer 120 selects an instruction value from second multiplexer 140, an instruction value from a distant memory (not shown), or a pre-fetch instruction value being stored in pre-fetch instruction register 130.

The third instruction multiplexer 160 selects the value to be loaded into the instruction register (IR) 170. This instruction value can be the next instruction from the program sequence to be executed, or a special case where the instruction is jammed into the pipeline as the response to an event or request. Examples of such events are interrupts or cycle stealing event where a special instruction is loaded into the IR 170.

Interrupts disrupt the normal program flow, while a cycle stealing event is just an insertion into the pipeline without disrupting the normal flow of the program sequence. At a cycle steal, the instruction from the program is stored into the hold register 300. After a cycle stealing, the instruction is loaded into IR 170 through the third instruction multiplexer 160 from the hold register 300, allowing the program sequence to continue normally.

In another example of the operations of the present invention with respect to the illustration of FIG. 15, during the execution of a DO-Until instruction (Loop Instruction), the instruction fetched from memory (near-by program memory or distant memory) and selected as the output of first instruction multiplexer 120 is the first instruction of the loop or start of the loop. This instruction is loaded into the top of loop instruction stack 200 for future use.

Lastly, the control logic for the first instruction multiplexer 120 and the second instruction multiplexer 140 causes the first instruction multiplexer 120 and the second instruction multiplexer 140 to work in conjunction to output:
1. an instruction value from the cache, through multiplexer 110, when the program code requires an instruction from cache when fetching from cache;
2. an instruction value from near-by program memory 100 in case of a program code discontinuity;
3. an instruction value from the pre-fetch instruction register 130 in case the program fetch is from near-by program memory 100 and sequential (no discontinuity);
4. an instruction value from distant memory in case of instruction fetch from distant memory; or
5. an instruction value from the top of loop instruction stack 200 in case of an end of loop discontinuity.

To improve functionality and enable nested loops and interruptible loops, the present invention utilizes top of loop instruction stack 200 to push on an instruction value at a start of a new loop or an interrupt for example and popped off the instruction value upon the program returning from an interrupt service routine or at the exit of a loop.

The present invention also handles a miss from the instruction cache. In this situation, the present invention forces an IDLE instruction into the instruction register 170. The IDLE instruction basically freezes the pipeline, and the CPU does nothing while waiting for the fetched instruction to come back. It is noted that if an interrupt event or a cycle steal event occurs, the present invention will allow the event to take over the pipeline, and the CPU can proceed executing either the interrupt instruction or the cycle steal instruction.

Figure 18:
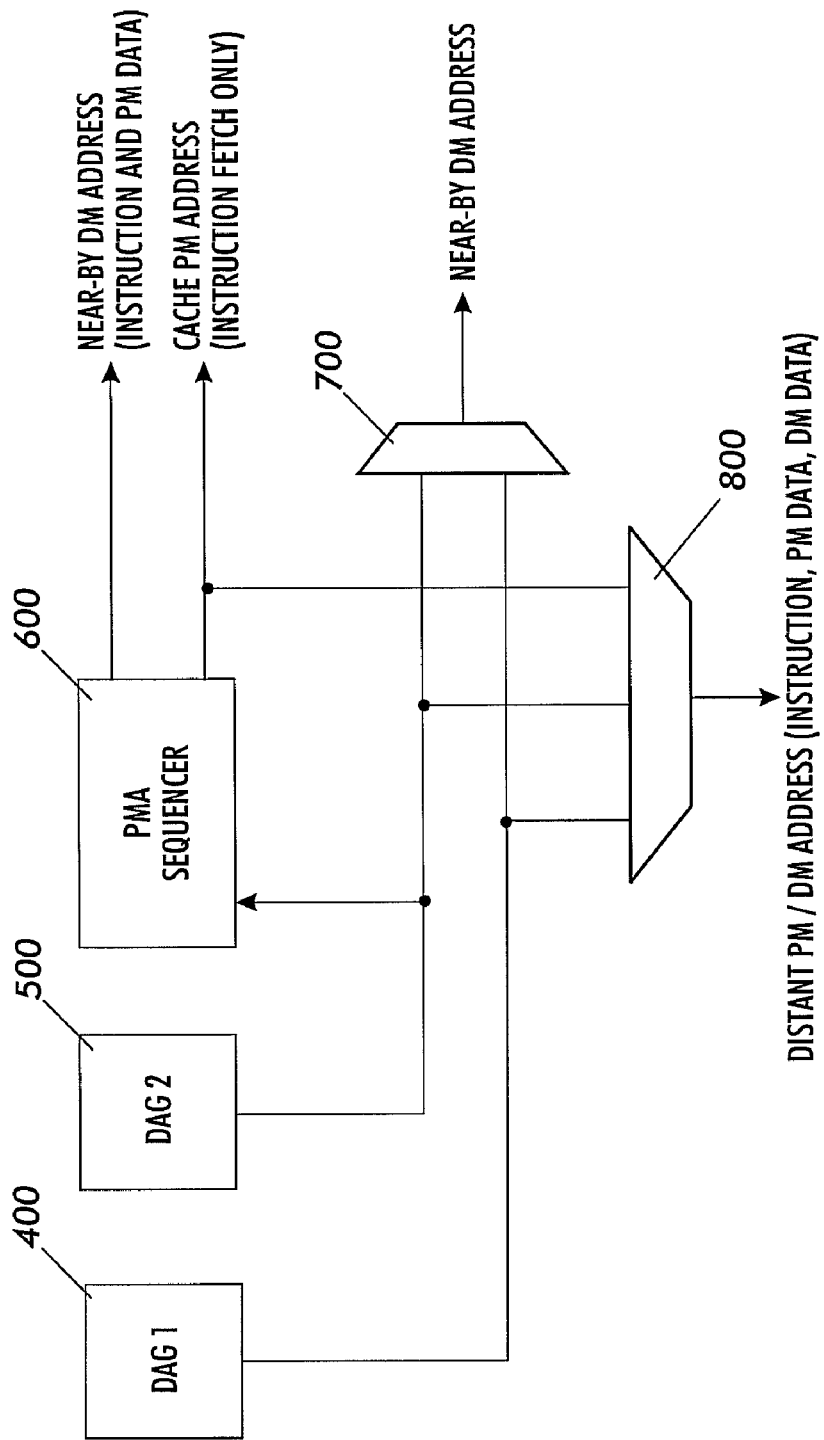
FIG. 18 illustrates a block diagram for generating addresses for various accesses according to the concepts of the present invention.

FIG. 18 illustrates the generation of addresses for various accesses according to the concepts of the present invention. As illustrated in FIG. 18, the addresses may come three sources: the Data Address Generator1 400 (DAG1), the Data Address Generator2 500 (DAG2), or the Program Memory Access Sequencer 600 (PMA Sequencer). The PMA Sequencer 600 generates the near-by program memory address that is for instruction and program memory data and the instruction cache memory address that is for an instruction fetch only.

The addresses, generated by DAG1 400 and DAG2 500, are fed to a first multiplexer 700 and a second multiplexer 800. Moreover, the address from DAG2 500 is also fed to the PMA Sequencer 600. The multiplexer 700 selects either the address from DAG1 400 or the address from DAG2 500 to be used as the address for the near-by data memory. The multiplexer 800 selects either the address from DAG1 400, the cache program memory address from the PMA Sequencer 600, or the address from DAG2 500 to be used as the address for the distant program memory or the distant data memory.

Although in the various descriptions above of the different embodiments of the present invention, it has been described that the present invention allows for two memory accesses per instruction cycle wherein each access triggered at different points of the cycle to avoid collision and these point being defined by two edges of a clock signal, the present invention also contemplates an embodiment wherein the memory receives commands indicating that two accesses must be performed in the cycle, and, based upon the main clock and the memory's internal logic and timing circuitry, the memory generates the two data reads (assuming there are reads and not two writes) one after the other.

In summary, the present invention allows for accessing the memory twice per cycle so that the information needed for the proper execution of instruction sequence is fed to the CPU wherein proper execution means one instruction per clock cycle and the CPU can perform the operations requested by the instruction as described in the instruction set. Proper execution also means the CPU is fed by next instruction from the program being executed with no stall. To allow two program memory accesses per cycle, the CPU provides the two addresses and associated control lines defining the accesses and provides the data to be written in the case of a write transaction. The present invention further provides a micro-architecture and methodology that effectively provide addresses and control lines and sequencing of the accesses so that there are no collisions and no need to do more than two accesses per instruction cycle.

As shown above, the micro-architecture of the present invention realizes a single cycle execution on a simple pipeline requiring two memory accesses by performing, in parallel, two memory accesses on a single memory block per clock cycle. More specifically, the present invention eases the constraints for speed due to such double access per clock cycle and simplifies the micro-architecture so that logic implementation, is more efficient in term of performance.

Finally, the present invention enables the use of single port memory, synchronous access in an architecture that executes all instructions in a single cycle including zero overhead loop or repeat function while still maintaining a high performance level.

While various examples and embodiments of the present invention have been shown and described, it will be appreciated by those skilled in the art that the spirit and scope of the present invention are not limited to the specific description and drawings herein, but extend to various modifications and changes all as set forth in the following claims.

What is claimed is:

1. A method for accessing a unified memory in a microprocessing system having a microprocessor, a one level pipeline, and a two-phase clock, such that an instruction is executed in a single instruction cycle, comprising:
   (a) fetching a program instruction from the unified memory;
   (b) determining if the fetched program instruction would require three unified memory accesses during a single instruction cycle for proper execution of the fetched program instruction, proper execution of the fetched program instruction being the microprocessor performing operations requested by the fetched program instruction in a single instruction cycle;
   (c) accessing the unified memory a first time, during the instruction cycle associated with the fetched program instruction, with a dummy access when it is determined that the fetched program instruction requires three unified memory accesses for proper execution of the fetched program instruction;
   (d) fetching a next program instruction from an instruction register, during the instruction cycle associated with the fetched program instruction from the unified memory, when it is determined that the fetched program instruction requires three unified memory accesses for proper execution of the fetched program instruction; and (e) accessing the unified memory a second time, during the instruction cycle associated with the fetched program instruction from the first access of the unified memory, with a data access when it is determined that the fetched program instruction from the first access of the unified memory requires three unified memory accesses for proper execution of the fetched program instruction from the first access of the unified memory.

2. The method as claimed in claim 1, wherein the data access is a read data access.

3. The method as claimed in claim 1, wherein the data access is a write data access.

4. The method as claimed in claim 1, wherein the fetched program instruction from the first access of the unified memory is a last instruction of a loop.

5. The method as claimed in claim 1, wherein the instruction register is an instruction stack, thereby enabling program instruction fetches for nested loops.

6. A method for accessing a unified memory in a microprocessing system having a microprocessor, a one level pipeline, and a two-phase clock, such that an instruction is executed in a single instruction cycle, comprising:

(a) fetching a program instruction, corresponding to a second instruction cycle, from the unified memory during a first instruction cycle;

(b) determining if the fetched program instruction corresponding to the second instruction cycle is a conditional program code discontinuity;

(c) accessing the unified memory a first time during the second instruction cycle with a dummy access when it is determined that the fetched program instruction corresponding to the second instruction cycle is a conditional program code discontinuity; and (d) accessing the unified memory a second time during the second instruction cycle to read a new instruction when it is determined the fetched program instruction corresponding to the second instruction cycle is a conditional program code discontinuity, thereby delaying instruction access from the unified memory for the second instruction cycle by a half cycle.

7. The method as claimed in claim 6, wherein the conditional program code discontinuity is a jump instruction.

8. The method as claimed in claim 6, wherein the conditional program code discontinuity is a call instruction.

9. A method for accessing a unified memory in a microprocessing system having a microprocessor, a one level pipeline, and a two-phase clock, such that an -instruction is executed in a single instruction cycle, comprising:

(a) fetching a program instruction from the unified memory;

(b) determining if the fetched program instruction is a loop initiation instruction;

(c) storing a first instruction of the loop in an instruction register when the fetched program instruction is a loop initiation instruction;

(d) executing the loop;

(e) determining if a fetched instruction during the execution of the loop is a last instruction of the loop;

(f) accessing the unified memory a first time, during the instruction cycle associated with the fetched last instruction of the loop, with a dummy access;

(g) fetching the first instruction of the loop from the instruction register, during the instruction cycle associated with the fetched last instruction of the loop; and (h) accessing the unified memory a second time, during the instruction cycle associated with the fetched last instruction of the loop, with a data access.

10. The method as claimed in claim 9, wherein the data access is a read data access.

11. The method as claimed in claim 9, wherein the data access is a write data access.

12. The method as claimed in claim 9, wherein the instruction register is an instruction stack, thereby enabling program instruction fetches for nested loops.

13. A method for accessing a unified memory in a microprocessing system during execution of a loop instruction, comprising:

(a) accessing a program instruction from the unified memory during a first instruction cycle;

(b) determining a type of program instruction;

(c) pre-fetching a second instruction from the unified memory;

(d) saving the pre-fetched instruction in a register when it is determined that the type of program instruction is a first instruction of a loop;

(e) fetching an instruction from the register when it is determined that the type of program instruction is a last instruction of a loop;

(f) accessing the unified memory with a dummy access during execution of the last instruction of the loop; and (g) accessing the unified memory, a second time, with a data access during execution of the last instruction of the loop.

14. The method as claimed in claim 13, wherein the pre-fetched instruction is saved in a stack when it is determined that the type of program instruction is first instruction of a loop to enable nested loops and interruptible loops, and a next instruction is fetched from the stack when it is determined that the type of program instruction is a last instruction of the loop.

* * * * *